United States Patent
August et al.

(10) Patent No.: US 8,026,819 B2
(45) Date of Patent: *Sep. 27, 2011

(54) RADIO TAG AND SYSTEM

(75) Inventors: Jason August, Toronto (CA); John K. Stevens, Stratham, NH (US); Paul Waterhouse, Copetown (CA)

(73) Assignee: Visible Assets, Inc., Mississauga, Ontario (CA)

( * ) Notice: Subject to any disclaimer, the term of this patent is extended or adjusted under 35 U.S.C. 154(b) by 1320 days.

This patent is subject to a terminal disclaimer.

(21) Appl. No.: 11/639,857

(22) Filed: Dec. 15, 2006

(65) Prior Publication Data

US 2010/0295682 A1 Nov. 25, 2010

Related U.S. Application Data

(60) Provisional application No. 60/744,524, filed on Apr. 10, 2006, provisional application No. 60/725,334, filed on Oct. 2, 2005, provisional application No. 60/596,527, filed on Oct. 3, 2005, provisional application No. 60/596,684, filed on Oct. 12, 2005.

(51) Int. Cl.
*G08B 21/22* (2006.01)
*G08B 21/18* (2006.01)

(52) U.S. Cl. ............... 340/573.1; 340/572.7; 340/572.1; 340/539.11; 340/539.13; 340/6.1; 340/8.1

(58) Field of Classification Search ............... 340/572.1, 340/572.4, 572.7, 572.8, 10.1, 10.34, 10.51, 340/539.22, 539.26, 505, 6.1, 8.1, 573.4; 705/22

See application file for complete search history.

(56) References Cited

U.S. PATENT DOCUMENTS

| | | | |
|---|---|---|---|
| 2,779,908 A | 1/1957 | Martin | |
| 3,268,900 A | 8/1966 | Waszkiewicz | |
| 3,406,391 A | 10/1968 | Von, Jr. | |
| 3,426,151 A | 2/1969 | Tygart et al. | |
| 3,427,614 A | 2/1969 | Vinding | |
| 3,500,373 A | 3/1970 | Minasy | |
| 3,528,014 A | 9/1970 | Albee | |
| 3,541,257 A | 11/1970 | McCormick et al. | |

(Continued)

FOREIGN PATENT DOCUMENTS

EP 0594375 4/1994

(Continued)

OTHER PUBLICATIONS

Lindsay, Jeffrey. "Cascading RFID Tags", Dec. 23, 2003, pp. 1-10.

(Continued)

*Primary Examiner* — George Bugg
*Assistant Examiner* — Sisay Yacob
(74) *Attorney, Agent, or Firm* — Larson & Anderson, LLC

(57) ABSTRACT

Passive tags use two antennas with only limited mutual coupling, one of which receives a power/clock field and the other of which receives a data signal. An area-reading antenna, or two or more antennas, are deployed to generate the power/clock field, from a base station. The base station, or active tags, or both, generate the data signals from time to time. This topology together with the use of low frequencies permits area reads, and permits small and economical passive tags, and further permits localization of a particular passive tag as being nearby to a particular active tag.

71 Claims, 30 Drawing Sheets

U.S. PATENT DOCUMENTS

| | | |
|---|---|---|
| 3,601,550 A | 8/1971 | Sparcklen |
| 3,689,885 A | 9/1972 | Kaplan et al. |
| 3,713,124 A | 1/1973 | Durland et al. |
| 3,713,148 A | 1/1973 | Cardullo et al. |
| 3,739,376 A | 6/1973 | Keledy |
| 3,859,624 A | 1/1975 | Kriofsky et al. |
| 4,019,181 A | 4/1977 | Olsson et al. |
| 4,361,153 A | 11/1982 | Slocum et al. |
| 4,436,203 A | 3/1984 | Reyner |
| 4,449,632 A | 5/1984 | Marusiak, Jr. |
| 4,724,427 A | 2/1988 | Carroll |
| 4,750,197 A | 6/1988 | Denekamp et al. |
| 4,774,504 A | 9/1988 | Hartings |
| 4,792,796 A | 12/1988 | Bradshaw et al. |
| 4,807,140 A | 2/1989 | Saulnier |
| 4,812,811 A | 3/1989 | Asbrink et al. |
| 4,821,291 A | 4/1989 | Stevens et al. |
| 4,857,893 A | 8/1989 | Carroll |
| 4,879,756 A | 11/1989 | Stevens et al. |
| 4,922,261 A | 5/1990 | O'Farrell |
| 4,937,586 A | 6/1990 | Stevens et al. |
| 5,012,236 A | 4/1991 | Troyk et al. |
| 5,053,774 A * | 10/1991 | Schuermann et al. ...... 340/10.34 |
| 5,103,234 A | 4/1992 | Watkins et al. |
| 5,129,519 A | 7/1992 | David et al. |
| 5,177,432 A | 1/1993 | Waterhouse et al. |
| 5,241,286 A | 8/1993 | Mirow |
| 5,245,534 A | 9/1993 | Waterhouse et al. |
| 5,260,694 A | 11/1993 | Remahl |
| 5,317,309 A | 5/1994 | Vercellotti et al. |
| 5,351,052 A | 9/1994 | D'Hont et al. |
| 5,374,815 A | 12/1994 | Waterhouse et al. |
| 5,485,166 A | 1/1996 | Verma et al. |
| 5,517,188 A | 5/1996 | Carroll |
| 5,519,381 A | 5/1996 | March et al. |
| 5,532,465 A | 7/1996 | Waterhouse et al. |
| 5,532,686 A * | 7/1996 | Urbas et al. ................ 340/10.51 |
| 5,591,951 A | 1/1997 | Doty |
| 5,682,143 A | 10/1997 | Brady et al. |
| 5,686,902 A | 11/1997 | Reis et al. |
| 5,774,053 A | 6/1998 | Porter |
| 5,920,576 A | 7/1999 | Eaton et al. |
| 5,929,779 A | 7/1999 | MacLellan et al. |
| 5,969,595 A | 10/1999 | Schipper et al. |
| 5,995,019 A | 11/1999 | Chieu et al. |
| 6,025,780 A | 2/2000 | Bowers et al. |
| 6,027,027 A | 2/2000 | Smithgall |
| 6,091,319 A | 7/2000 | Black et al. |
| 6,104,281 A | 8/2000 | Heinrich et al. |
| 6,127,917 A | 10/2000 | Tuttle |
| 6,127,928 A | 10/2000 | Issacman et al. |
| 6,127,976 A | 10/2000 | Boyd et al. |
| 6,164,551 A | 12/2000 | Altwasser |
| 6,176,433 B1 | 1/2001 | Uesaka et al. |
| 6,195,006 B1 | 2/2001 | Bowers et al. |
| 6,208,235 B1 | 3/2001 | Trontelj |
| 6,222,452 B1 | 4/2001 | Ahlstrom et al. |
| 6,236,911 B1 | 5/2001 | Kruger |
| 6,280,544 B1 | 8/2001 | Fox et al. |
| 6,294,997 B1 | 9/2001 | Paratore et al. |
| 6,297,734 B1 | 10/2001 | Richardson et al. |
| 6,318,636 B1 | 11/2001 | Reynolds et al. |
| 6,323,782 B1 | 11/2001 | Stephens et al. |
| 6,329,944 B1 | 12/2001 | Richardson et al. |
| 6,335,688 B1 | 1/2002 | Sweatte |
| 6,354,493 B1 | 3/2002 | Mon |
| 6,377,203 B1 | 4/2002 | Doany |
| 6,512,457 B2 | 1/2003 | Irizarry et al. |
| 6,512,478 B1 | 1/2003 | Chien |
| 6,543,491 B1 | 4/2003 | Chung |
| 6,566,997 B1 | 5/2003 | Bradin |
| 6,584,301 B1 | 6/2003 | Bohn et al. |
| 6,593,845 B1 | 7/2003 | Friedman et al. |
| 6,624,752 B2 | 9/2003 | Klitsgaard et al. |
| 6,662,078 B1 | 12/2003 | Hardgrave et al. |
| 6,696,954 B2 | 2/2004 | Chung |
| 6,700,491 B2 | 3/2004 | Shafer |
| 6,705,522 B2 | 3/2004 | Gershman et al. |
| 6,724,308 B2 | 4/2004 | Nicholson |
| 6,738,628 B1 | 5/2004 | McCall et al. |
| 6,745,027 B2 | 6/2004 | Twitchell, Jr. |
| 6,900,731 B2 | 5/2005 | Kreiner et al. |
| 6,927,687 B2 | 8/2005 | Carrender |
| 7,028,861 B2 | 4/2006 | Sayers et al. |
| 7,044,373 B1 | 5/2006 | Garber et al. |
| 7,049,963 B2 | 5/2006 | Waterhouse et al. |
| 7,089,099 B2 | 8/2006 | Shostak et al. |
| 7,098,794 B2 | 8/2006 | Lindsay et al. |
| 7,098,856 B2 | 8/2006 | Okado |
| 7,103,460 B1 | 9/2006 | Breed |
| 7,161,476 B2 | 1/2007 | Hardman et al. |
| 7,191,932 B2 | 3/2007 | Fobbe et al. |
| 7,193,515 B1 | 3/2007 | Roberts et al. |
| 7,242,301 B2 | 7/2007 | August et al. |
| 7,256,695 B2 | 8/2007 | Hamel et al. |
| 2001/0048361 A1 | 12/2001 | Mays et al. |
| 2002/0041235 A1 | 4/2002 | Van Horn et al. |
| 2002/0111819 A1 | 8/2002 | Li et al. |
| 2003/0055689 A1 | 3/2003 | Block et al. |
| 2004/0053641 A1 | 3/2004 | Leung et al. |
| 2004/0066366 A1 | 4/2004 | Jung et al. |
| 2004/0069849 A1 | 4/2004 | Stevens et al. |
| 2004/0134620 A1 | 7/2004 | Soeborg |
| 2004/0149822 A1 | 8/2004 | Stevens et al. |
| 2004/0176032 A1 | 9/2004 | Kolola et al. |
| 2004/0205350 A1 | 10/2004 | Waterhouse et al. |
| 2004/0217865 A1 | 11/2004 | Turner |
| 2004/0233054 A1 | 11/2004 | Neff et al. |
| 2005/0029345 A1 | 2/2005 | Waterhouse et al. |
| 2005/0043850 A1 | 2/2005 | Stevens et al. |
| 2005/0043886 A1 | 2/2005 | Stevens et al. |
| 2005/0083213 A1 | 4/2005 | Stevens et al. |
| 2005/0086983 A1 | 4/2005 | Stevens et al. |
| 2005/0149226 A1 | 7/2005 | Stevens et al. |
| 2005/0205817 A1 | 9/2005 | Marcichow et al. |
| 2005/0251330 A1 | 11/2005 | Waterhouse et al. |
| 2006/0124662 A1 | 6/2006 | Reynolds et al. |
| 2006/0128023 A1 | 6/2006 | Waterhouse et al. |
| 2006/0164232 A1 | 7/2006 | Waterhouse et al. |
| 2006/0232417 A1 | 10/2006 | August et al. |

FOREIGN PATENT DOCUMENTS

| | | |
|---|---|---|
| KR | 2004008948 | 1/2004 |
| WO | 9608760 | 3/1996 |
| WO | 9831608 A1 | 7/1998 |
| WO | 02071382 | 9/2002 |
| WO | 03094106 | 11/2003 |
| WO | 2006014666 | 2/2006 |

OTHER PUBLICATIONS

Cardullo, "RFID Pioneers Discuss its Origins," The Mercury News, Sun, Jul. 18, 2004.

Texas Insruments, Phillips Semiconductors, and Tagsys Inc., "Item-Level Visibility in the Pharmaceutical Supply Chain: A comparision of HF, UHF RFID Technologies," Jul. 2004.

Food and Drug Administration, "Radio Frequency Identification Feasibility Studies and Pilot Programs for Drugs," Guidance for FDA Staff and Industry, Compliance Policy Guides, Sec 400.210, Nov. 2004.

Scott Kirsner, "Radio Tags are Falling Off the Fast Track," The Boston Globe, May 31, 2004.

Barnaby Feder, "Despite Wal-Mart's Edict, Radio Tags Will Take Time," The New York Times, Dec. 27, 2004.

EPCglobal, Web Page Tag Specifications, Jan. 2005.

IEEE-USA, "The State of Radio Frequency Identification (RFID) Implementation and Its Policy Implications," Nov. 21, 2005.

* cited by examiner

RADIO TAG AND SYSTEM

CROSS-REFERENCE TO RELATED APPLICATIONS

This application claims priority from U.S. Provisional Patent Application No. 60/725,334, filed Oct. 2, 2005, from U.S. Provisional Patent Application No. 60/596,527, filed Oct. 3, 2005, from U.S. Provisional Patent Application No. 60/596,684, filed Oct. 12, 2005, and from U.S. Provisional Patent Application No. 60/744,524, filed Apr. 10, 2006 each of which is incorporated herein by reference for all purposes.

This application is related to and incorporates by reference U.S. patent application Ser. No. 10/481,423, filed Dec. 22, 2003, U.S. patent application Ser. No. 10/820,366, filed Apr. 8, 2004, U.S. patent application Ser. No. 10/832,853, filed Apr. 27, 2004, U.S. Pat. No. 7,049,963, filed Jun. 10, 2005, U.S. Patent Application No. 60/700,886, filed Jul. 19, 2005, U.S. Provisional Patent Application No. 60/707,218, filed Aug. 10, 2005, patent application Ser. No. 11/162,907, filed Sep. 28, 2005, patent application Ser. No. 11/164,213, filed Nov. 15, 2005, and Provisional Patent Application No. 11/276,096, filed Feb. 14, 2006.

FIELD OF THE INVENTION

The present invention relates to a passive low frequency (inductive, LF) radiating, radio transceiver tag, an active radiating transceiver tag, and antenna system. The passive tag does not require a battery or frequency reference means, but is capable of operating within an active network of radiating transceiver radio tags that may have batteries and frequency reference means. The passive tag may be converted into an active radiating tag simply by adding a battery and a crystal.

BACKGROUND OF THE INVENTION

Radio Frequency Identity tags, or RFID tags, have a long history and have in recent times RFID has become synonymous with "passive backscattered transponders." Passive transponders obtain power and a clock reference from a carrier and communicate by detuning an antenna, often with a fixed pre-programmed ID. These tags are designed to replace barcodes and are capable of low-power two-way communications. Much of the patent literature surrounding these radio tags and RFID tags, as well as the published non-patent literature, use terminology that has not been well defined and can be confusing.

Many of the patents referenced do not make many distinctions outlined in the glossary and their authors may not at that time been fully informed about the functional significance of the differences outlined above. For example, many of the early issued patents (e.g. U.S. Pat. No. 4,724,427, U.S. Pat. No. 4,857,893, U.S. Pat. No. 3,739,376, U.S. Pat. No. 4,019,181) do not specify the frequency for the preferred embodiment yet it has become clear that dramatic differences occur in performance and functional ability depending on the frequency.

One of the first references to a radio tag in the patent literature was a passive radiating transponder described in U.S. Pat. No. 3,406,391, Vehicle Identification System, issued in 1968. The device was designed to track moving vehicles. U.S. Pat. No. 3,406,391 teaches that a carrier signal may be used to communicate to a radio tag as well as provide power. The tags were powered using microwave frequencies and many subcarrier frequencies were transmitted to the tag. The radio tag was programmed to pre-select several of the subcarriers and provided an active re-transmission back when a subcarrier message correspond to particular pre-programmed bits in the tag. This multifrequency approach limited data to about five bits to eight bits and the range of the devices was limited to only a few inches. U.S. Pat. No. 3,541,257, Communication Response Unit, issued in 1970 further teaches that a digital address may be transmitted and detected to activate a radio tag. The radio tag may be capable of transmitting and receiving electromagnetic signals with memory and the radio tag may work within a full addressable network and has utility in many areas. Many other similar devices were described in the following years (e.g. *The Mercury News*, "RFID Pioneers Discus Its Origins," Sun, Jul. 18, 2004).

U.S. Pat. No. 3,689,885, Inductively Coupled Passive Responder and Interrogator Unit Having Multidimension Electromagnetic Field Capabilities, issued in 1972 and U.S. Pat. No. 3,859,624, Inductively Coupled Transmitter-Responder Arrangement also issued in 1972. These patents teach that a passive radiating digital radio tag may be powered and activated by induction using low frequencies (e.g., 50 kHz) and transmit coded data back modulated at a higher frequency (e.g., 450 kHz) to an integrator. It also teaches that the clock and 450 kHz transmitting carrier from the radio tag may be derived from the 50 kHz induction power carrier. The ceramic filter required to increase the frequency from 50 kHz to a high frequency is, however, an expensive large external component, and phase-locked loops or other methods commonly used to multiply a frequency upward would consume considerable power. These tags use a low frequency "power channel" to power the tag, to serve as the time base for the tag, and finally to serve as the trigger for the tag to transmit its ID. Thus, the power channel contains a single bit of on/off information.

This is shown in FIG. 1. The active low frequency transceiver tag consists of four basic components:
1. the antenna, typically a wound loop or coil, that has been tuned to low frequency (50 kHz)
2. a ceramic filter to multiply the low frequency up to a higher frequency (e.g. 450 kHz)
3. logic and
4. storage to generate an active signal that drives an antenna and transmits the tag's ID.

In contrast, as will be described in detail below, the present invention uses the carrier only as a power source and timebase generator. It does not necessarily use the carrier to trigger the transmission of the ID. This makes it possible for the tag to use half-duplex protocol that makes it possible for the tag to be written and read by an active radiating tag.

U.S. Pat. No. 3,713,148, Transponder Apparatus and System, issued in 1973 teaches that the carrier to the transponder may also transmit digital data and that the interrogation means (data input) may also be used to power the transponder. This patent also teaches that nonvolatile memory may be added to store data that might be received and to track things like use and costs for tolls. The inventors do not specify or provide details on frequency or antenna configurations.

The devices referenced above all rely on the antenna in radiating transceiver mode, where the power from the radio tag is actually "pumped" into a tuned circuit that includes a radiating antenna, which in turn produces an electromagnetic signal that can be detected at a distance by an interrogator.

U.S. Pat. No. 3,427,614, Wireless and Radioless (Nonradiant) Telemetry System For Monitoring Conditions, issued in 1969 was among the first to teach that the radio tag antenna may communicate simply by detuning the antenna rather than radiating power through the tuned antenna. The change in tuned frequency may be detected by a base-station generating a carrier. This non-radiating mode reduces the power required to operate a tag and puts the detection burden on the base station. In effect the radio tag's antenna becomes part of a tuned circuit created by the combination of the base-station, and a carrier. Any change in the radio tag's tuned frequency by any means can be detected by the base-station's tuned carrier circuit. This is also often referred to as a back-scattered mode and is the basis for most modern RF-ID radio tags.

Many Electronic Article Surveillance (EAS) systems also function using this backscattered non-radiating mode (see U.S. Pat. No. 4,774,504; U.S. Pat. No. 3,500,373; and U.S. Pat. No. 5,103,234, Electronic Article Surveillance System) and most are also inductive frequencies. Many other telemetry systems in widespread use for pacemakers, implantable devices, and sensors in rotating centrifuges (U.S. Pat. No. 3,713,124, Temperature Telemetering Apparatus) also make use of this backscattered mode to reduce power consumption. U.S. Pat. No. 4,361,153 (Implant Telemetry System) teaches that low frequencies (Myriametric) can transmit though conductive materials and work in harsh environments. Most of these implantable devices also use backscattered communication mode for communication to conserve battery power.

Thus, more recent and modern RF-ID tags are passive, backscattered transponder tags and have an antenna consisting of a wire coil or an antenna coil etched or silk-screened onto a PC board (e.g. see U.S. Pat. No. 4,857,893: Single chip transponder device, 1989; U.S. Pat. No. 5,682,143, Radio Frequency Identification Tag). These tags use a carrier that is reflected back from the tag. The carrier is used by the tag for four functions:

1. The carrier contains the incoming digital data stream signal; in many cases the carrier only performs the logical function to turn the tag on/off and to activate the transmission of its ID. In other cases the data may be a digital instruction.
2. The carrier serves as the tag's power source. The tag receives a carrier signal from a base station and uses the rectified carrier signal to provide power to the integrated circuitry and logic on the tag.
3. The carrier serves as a clock and time base to drive the logic and circuitry within the integrated circuit. In some cases the carrier signal is divided to produce a lower clock speed.
4. The carrier may also in some cases serve as a frequency and phase reference for radio communications and signal processing. The tag can use one coil to receive a carrier at a precise frequency and phase reference for the circuitry within the radio tag for communications back through a second coil to the reader/writer making accurate signal processing possible. (U.S. Pat. No. 4,879,756 Radio Broadcast Communication Systems).

Thus the main advantage of a passive backscattered transponder is that it eliminates the battery as well as a crystal in LF tags. HF and UHF tags are unable to Use the carrier as a time base because the speed would require high speed chips and power consumption would be too high. It is therefore generally assumed that a passive backscattered transponder tag is less costly than an active or transceiver tag since it has fewer components and is less complex.

These modern non-radiating, transponder backscattered RFID tags typically operate at frequencies within the Part 15 rules of the FCC (Federal Communication Commission) between 10 kHz to 500 kHz (Low Frequency or Ultra Low Frequency ULF), 13.56 MHz (High Frequency, HF) in or 433 MHz (MHF) and 868/915 MHz or 2.2 GHz (Ultra High Frequency UHF). The higher frequencies are typically chosen because they provide high bandwidth for communications, on a high-speed conveyor for example, or where many thousands of tags must be read rapidly. In addition, it is generally believed that the higher frequencies are more efficient for transmission of signals and require much smaller antennas for optimal transmission. (It may be noted that a self-resonated antenna for 915 MHz can have a diameter as small as 0.5 cm and may have a range of tens of feet.)

The major disadvantage of the backscattered mode radio tag, however, is that it has limited power, limited range, and is susceptible to noise and reflections over a radiating active device. This is not because of loss of communication signal but instead is largely because the passive tag requires a minimum of 1 volt on its antenna to power the chip. As a result many backscattered tags do not work reliably in harsh environments and require a directional "line of sight" antenna.

One proposed method to extend the range of a passive backscattered tag has been to add a thin flat battery to the battery to the backscattered tag so that the power drop on the antenna is not the critical range limiting factor. However, since all of these tags use high frequencies the tags must continue to operate in backscattered mode to conserve battery life. The power consumed by any electronic circuit tends to increase with the frequency of operation. Thus, if a chip were to use an industry standard 280 mAh capacity CR2525 Li cell (which is the size of a quarter) we would expect battery life based solely on operating frequency to be:

TABLE 1

Assumes a 280 mAh Li Battery:

| Frequency | Power (uAHr) Current (uA) | Predicted Life | Units |
|---|---|---|---|
| 128 kHz | 1 | 31.00 | Years |
| 13.56 MHz | 102 | 3.78 | Months |
| 915 MHz | 7,031 | 1.66 | Days |

Thus most recent active RFID tags that may have a battery to power the tag circuitry, such as active tags and devices operating in the 13.56 MHz to 2.3 GHz frequency range, also work as backscattered transponders (U.S. Pat. No. 6,700,491: Radio frequency identification tag with thin-film battery for antenna, 2004; also see US Patent No. 2004/0217865A1, RFID tag 2004, for detailed overview of issues). Because these tags are active backscattered transponders they cannot work in an on-demand peer-to-peer network setting, and they require line-of-sight antennas that provide a carrier that "illuminates" an area or zone or an array of carrier beacons.

Active radiating transceiver tags in the high-frequency range (433 MHz) that can provide on-demand peer-to-peer network of tags are available (e.g. SaviTag ST-654, U.S. Pat. No. 5,485,166: Efficient electrically small loop antenna with a planar base element, 1996) and full visibility systems described above (U.S. Pat. No. 5,686,902, U.S. Pat. No. 6,900,731). These tags do provide full functionality and what might be called Real-Time Visibility, but they are expensive (over $100.00 US) and large (videotape size, 6¼×2⅛×1⅛ inches) because of the power issues described above and must use replaceable batteries since even with such a 1.5 inch by 6 inch Li battery these tags are only capable of 2,500 reads and writes.

It is also generally assumed that a an HF or UHF passive backscattered transponder radio tags will have a lower cost-to-manufacture as compared with an LF passive backscattered transponder because of the antenna. An HF or UHF tag can obtain a high-Q 1/10-wavelength antenna by etching or use of conductive silver silk-screening the antenna geometry onto a flexi circuit. An LF or ULF antenna cannot use either because the Q will be too low due to high resistance of the traces or silver paste. So LF and ULF tags must use wound coils made of copper.

Thus, in summary a passive transponder tag has the potential to lower cost by eliminating the need for a battery as well as an internal frequency reference means. An active backscattered transponder tag eliminates the extra cost of a crystal but also provides for enhanced amplification of signals over a passive backscattered transponder and enhanced range. In addition, it is also possible to use a carrier reference to provide enhanced anti-collision methods so as to make it possible to read many tags within a carrier field (U.S. Pat. No. 6,297,734, U.S. Pat. No. 6,566,997, U.S. Pat. No. 5,995,019, and U.S. Pat. No. 5,591,951). Finally active radiating transceiver tags require large batteries, are expensive and may cost tens to hundreds of dollars.

A second major area of importance to this technology is the use of two co-planar antennas in radio tags placed in such a way as to inductively decouple the antennas from each other so they may be independently tuned. U.S. Pat. No. 2,779,908, Means for Reducing Electro-Magnetic Coupling 1957 teaches that electromagnetic coupling of two co-planar air-core coils may be minimized by shifting the coils as well as placing a neutralizing shorted coil inside the area of the two coils. U.S. Pat. No. 4,922,261 (Aerial systems) teaches that this may be used in a passive transponder tag in that two frequencies and two antennas may be used, one for transmitting data and a second for receiving data thereby providing double the communication speed with full-duplex data transfers. U.S. Pat. No. 5,012,236 (Electromagnetic Energy Transmission and Detection Apparatus) makes use of decoupled coils to enhance range and minimize sensitivity to angles. FIG. 2 shows the arrangement and method to decouple two antennas described by U.S. Pat. No. 4,922,261. In this case one antenna is used for transmitting data, and the second is used for receiving data. The antenna arrangement makes it possible to have two data communication frequencies so the tag can communicate with a full-duplex protocol.

U.S. Pat. No. 6,584,301, Inductive Reader Device and Method with Integrated Antenna and Signal Coupler, also discloses a co-planar geometry that minimizes coupling between two coils. The purpose was to enable a two-frequency full-duplex mode of communication to enhance communications speed. In most cases the speed of communication is not a critical issue in visibility systems and other applications described below. FIG. 3 shows this coil arrangement to decouple two antennas. Coil 6 is shifted in the same plane from coil 5. The primary purpose disclosed in the prior art is to provide higher data communication speeds between tag and the base station.

U.S. Pat. No. 6,176,433, (Reader/writer Having Coil Arrangements to Restrain Electromagnetic Field Intensity at a Distance) makes use of a co-planar coil to enhance range of a backscattered transponder tag used as an IC card and using a 13.56 MHz carrier. The isolated antennas may be used to communicate to the tag and to maximize power required to transmit to the tag under within the limits of the Wireless Communications Act.

Many publications and patents teach the advantages of using RFID tags for tracking products in warehouses, packages etc. In some cases passive transponders may be used but additional location and automated systems may be required for the base-station (e.g. U.S. Pat. No. 6,705,522, Mobile Entity Tracker, 2004). However, most investigators now recognize that a fully integrated peer-to-peer on-demand network approach using active radio tags has many functional advantages in these systems over a system (U.S. Pat. No. 6,705,522: Mobile Entity Tracker; U.S. Pat. No. 6,738,628: Electronic Physical Asset Tracking; US Pub. Patent Application No. 2002/0111819A1, Supply chain visibility for real-time tracking of goods; U.S. Pat. No. 6,900,731, Method for Monitoring and Tracking Objects; U.S. Pat. No. 5,686,902, Communication system for communicating with tags; U.S. Pat. No. 4,807,140, Electronic Label Information Exchange System). One of the major disadvantages of a passive nonradiating system is that it requires the use of handheld readers or portals to read tags and changes in process control (e.g. U.S. Pat. No. 6,738,628: Electronic Physical Asset Tracking). A system that provides data without process change and without need to carry out portal reads is more likely to be successful as a visibility system.

It will also be appreciated that the prior art has assumed low frequency tags to be slow, short range, and too costly. For example, both U.S. Pat. No. 5,012,236, U.S. Pat. No. 5,686, 902 discuss the short-range issues associated with magnetic induction and low frequency tags. Because of the supposed many apparent disadvantages of ULF and LF, the RF-ID frequencies now recommended by many commercial (Item-Level Visibility In the Pharmaceutical Supply Chain: A Comparison of HF, UHF RFID Technologies, July 2004, Texas Instruments, Phillips Semiconductors, and TagSys Inc.), government organizations (see Radio Frequency Identification Feasibility Studies and Pilot, FDA Compliance Policy HFC-230, Sec 400. 210, November, 2004, recommend use of LF, HF or UHF) as well as standards associations (EPCglobal, web page tag specifications, January 2005, note LF and ULF are excluded) do not mention or discuss the use of ULF as an option in many important retail applications. Many of the commercial organizations recommending these higher frequencies believe that passive and active radio tags in these low frequencies are not suitable for any of these applications for reasons given above.

In addition, several commercial companies actually manufacture both ULF and LF radio tags (e.g. both Texas Instruments and Philips Semiconductor. See Item-Level Visibility In the Pharmaceutical Supply Chain: A Comparison of HF, UHF RFID Technologies, July 2004, Texas Instruments, Phillips Semiconductors, and TagSys Inc.) yet only recommend the use of 13. 56 MHz or higher again because of the perceived disadvantage of ULF and LF outlined above, and the many perceived advantages of HF and UHF).

In sum, system designers for modern applications have chosen not to use LF radio tags because:
1. ULF is believed to have very short range since it uses largely inductive or magnetic radiance that drops off proportional to $1/d^3$ while far-field HF and UHF drops off proportional to $1/d$, where d is distance from the source. Thus, the inductive or magnetic radiance mode of transmission will theoretically limit the distance of transmission, and that has been one of the major justifications for use of HF and UHF passive radio tags in many applications.
2. The transmission speed is inherently slow using ULF as compared to HF and UHF since the tag must communicate with low baud rates because of the low transmission carrier frequency.
3. Many sources of noise exist at these ULF frequencies from electronic devices, motors, fluorescent ballasts, computer systems, power cables.
4. Thus ULF is often thought to be inherently more susceptible to noise.
5. Radio tags in this frequency range are thought to be more expensive since they require a wound coil antenna because of the requirement for many turns to achieve optimal electrical properties (maximum Q). In contrast HF and UHF tags can use antennas etched directly on a printed circuit board and ULF would have even more serious distance limitations with such an antenna.

6. Current networking methods used by high frequency tags, as used in HF and UHF, are impractical due to such low bandwidth of ULF tags described above in point 3 immediately above.

SUMMARY OF THE INVENTION

Briefly, an embodiment of the present invention uses a low frequency, active radiating transceiver tag. There are many non-obvious and unexpected advantages in the use of these low frequency tags. They are especially useful for visibility and for tracking objects with large area loop antennas over other more expensive active radiating transponder HF and UHF tags (e.g. Savi ST-654). These LF tags will function in harsh environments near water and steel and may have a full two-way digital communications protocol, digital static memory and optional processing ability, and can have sensors with memory and can have ranges of up to 100 feet. The active radiating transceiver tags can be far less costly than other active transceiver tags (many in the under-one-dollar range), and are often less costly than passive backscattered transponder RFID tags, especially those that require memory and make use of EEPROM. These low-frequency radiating transceiver tags also provide a high level of security since they have an on-board crystal than can provide a date-time stamp making full AES (advanced encryption standard) encryption and one-time-based pads possible. In most cases, LF active radiant transponder tags have a battery life of 10-15 years using inexpensive CR2525 Li batteries with 100,000 to 250,000 transmissions.

The frequency will change the radio tag's ability to operate in harsh environments, near liquids, or conductive materials, as well as the tag's range and power consumption and battery life.

Finally, these active LF tags may use amplitude modulation or in some cases phase modulation, and can have ranges of many tens of feet up to hundred feet with use of a loop antenna (see FIGS. 16, 9, 10, 11). The active tags include a battery, a chip and a crystal. As stated above, in many cases the total cost for such a tag can be less than a HF and ULF passive transponder tag, especially if the transponder includes EEPROM, and has longer range. In cases where the transponder tags use EEPROM, the low frequency active transceiver tag can actually be faster since it uses RAM for storage and write times for EEPROM is quite long. Finally, because these new active transceiver tags use induction as the primary communication mode, and induction works work optimally at low frequencies LF they are immune to nulls often found near steel and liquids with HF and UHF tags. US Published Patent No. 2004/0217865 A1 summarizes much of the prior art and supports the non-obvious nature of a low-frequency transceiver as a RF-ID tag.

These LF radiating transceiver tags may be used in a variety of applications; however their intended use is in visibility networks for tracking assets in warehouses, and in moving vehicles. They overcome many of the disadvantages of a passive backscattered transponder tag system (see U.S. Pat. No. 6,738,628, Electronic Physical Asset Tracking). The tags may also be used for visibility networks for airline bags, evidence tracking, and livestock tracking, and in retail stores for tracking products.

In this application we disclose a novel version of the LF transponder that is passive and uses the same protocol as the LF active radiating transceiver tag described above. It can function in a full peer-to-peer network with any LF active radiating transponder. However this invention is passive, does not require a battery or crystal as a frequency reference, and as a result may be extremely low cost. The tags make use of two coplanar antennas. One antenna used for power and is narrowly tuned for Myriametric frequencies from 8.192 kHz or to 16.384 kHz, or to 32.768 kHz or some other higher harmonic of the standard watch crystal frequency (32.768 kHz) (for example 65.536 kHz). A second coplanar antenna is broadly tuned and used for data and uses mid-range kilometric frequency, for example 131.072 kHz or up to 458.752 kHz derived from the power carrier. Thus, the higher frequency is a harmonic of a watch crystal frequency of 32.768 kHz. The antennas may be positioned in a co-planar geometry in such a way that they are not inductively coupled, so that all fields cancel each other. This makes it possible to tune each antenna independently to an optimal frequency.

Another aspect of the invention is the design of a low-powered frequency multiplier so that a low-frequency power source derived from the narrowly tuned antenna may be multiplied up to a higher communication frequency. This design may be placed on an integrated circuit and unlike other methods (phase locked loops) does not consume significant power and does not require any external components. The circuit provides any multiple up of input frequency. This is in contrast to other "two frequency" systems that must use either an external component to multiply the frequency up (U.S. Pat. No. 3,689,885) or use a higher carrier frequency so a simple divider may be used to obtain a communication frequency (see U.S. Pat. No. 4,879,756).

In another embodiment of the invention since the carrier is used for power only and is "information free," the power base station that is used to provide this carrier may be extremely simple with only an oscillator and tuned loop antenna. The power station may be optionally independent of the data base station and may be placed close to the passive tag. This means the data base station may communicate with both active and passive tags using the same half-duplex protocol. It also means that a passive tag can optionally be maintained in a power-on state constantly with a separate antenna, and much simpler readers (handhelds) or other base stations may read and write without range issues related to the power channel. Another aspect of the invention is that the same circuitry used on the passive radiating transceiver tag may be used in the design of an active radiating tag. The power coil and rectifier circuit may be replaced with a Li battery (CR2525 for example) and the frequency reference with a watch crystal. These tags may have displays LEDs and sensors and operate with same communications systems on a shelf. They may therefore be used to locate the passive radiating tags on a shelf for example, and/or to indicate things like price and inventory levels on a shelf similar to that described in U.S. Pat. No. 4,879,756.

Another unique aspect of the invention is that a first co-planar antenna is used for power transmission and not for data communication. A second isolated co-planar antenna may be used for half-duplex two-way communications. Federal regulations under Part 15 limit power that may be transmitted without a license based on frequency, and the available legal power increases as the frequency decreases (see FIG. 17). However, communications speed is also compromised as the frequency decreases. Therefore, isolation of the two functions—power and data—with separate antennas with separate tuning characteristics provides for an enhanced optimized radio tag in that power may be maximized and communications speed may also be maximized.

In another embodiment of the invention, by using two isolated antennas, the tuning and Q may be independent. The power coil may have a high Q and tuned to a very low frequency. This maximizes the current and total power available to the circuitry. It also provides for an accurate frequency reference eliminating an internal reference such as a crystal. One of the advantages of using low frequencies under Part 15 FCC regulations is that the frequency bandwidth is not narrowly regulated (see FIG. 17). Higher frequencies require special world-wide bandwidth regulation within narrow limits. Thus, the second communications antenna may be broadly tuned to a higher frequency with a very low Q. This accomplishes two things:

1. Data communications is now more immune to any detuning that might occur as a result of steel or metal in a harsh environment. Such harsh environments are typically found in many applications. High-Q narrowly tuned antennas will be more susceptible to detuning.

2. It makes it possible to use a broadband frequency range that may span many Hertz (e.g. a square wave) for communications to the tag, creating what might be considered spread-spectrum system without any complex circuitry. The communication antenna is not tuned in the classic way. The energy that is stored in the inductor is redirected back to the power supply. So the frequency may be changed without any penalty. In fact, in an exemplary embodiment, a direct-sequence spread-spectrum code is used in the transmission. The disadvantage of doing this is an increase in power consumption and because of the difficulty is making a receiver; this would make peer-to-peer communication impractical.

Another aspect of the invention is that because the radio tag uses low frequencies, the power requirements for the chip are reduced as compared with use of a similar active radiating system at HF or UHF. This enables a long battery life of 10-15 years with a low-cost Li thin battery. The battery does not have to be recharged or replaced. The HF, MHF and UHF systems, in contrast, have very large batteries that must be recharged often or replaced every year to two years.

In another embodiment of the invention, the passive radiating radio tag consists only of two low-cost copper coils and an integrated circuit. No external components are required and only three or four contacts from the two antennas are necessary on the integrated circuit. If slightly enlarged pads are used this can be accomplished using conventional wire bonding equipment thereby eliminating the need for a printed circuit board. Other patents teach (U.S. Pat. No. 5,682,143, Radio frequency identification tag, 1997; S4857893: Single chip transponder device, 1989) that the circuit may be placed on a board and the antenna can be etched directly onto the PC board. By integrating the antenna directly on the printed circuit board it is assumed that it is possible to reduce costs. However the cost of the PC board or flexi circuit is considerable more than the cost of a wound copper coil.

Another aspect of the invention is that with all of these factors taken into account the passive radiating tag has a communication range of three to four feet, as compared to only a few inches with previous backscattered LF and HF radio tag designs. Moreover, in EAS applications the presence detection of a passive radiating tag using a known standard code is eight to ten feet. Thereby, these tags may be used for real-time visibility systems in retail applications where items must be identified on a shelf but may also replace the EAS systems to stop theft. These active tags combined with a passive radiating tag have many other obvious applications.

DETAILED DESCRIPTION

We provide a glossary of words and concepts as used within this document:
Radio Tag—any telemetry system that communicates via magnetic (inductive communications) or electric radio communications, to a base station or reader or to another radio tag.
Passive Radio Tag—A radio tag that does not contain a battery.
Active Radio Tag—A radio tag that contains a battery.
Transponder—A radio tag that requires a carrier wave from an integrator or base station to activate transmission or other function. The carrier is typically used to provide both power and a time-base clock, only typically at high frequencies.
Non-Radiating Transponder—A radio tag that may be active or passive and communicates via de-tuning or changing the tuned circuit of an antenna or coil. Does not induce power into a transmitting antenna or coil.
Radiating Transponder—A radio tag or transponder that may be an active or passive tag, but communicates to the base station or interrogator by transmitting a radiated detectable electromagnetic signal by way of an antenna. The radio tag induces power into an antenna for its data transmission.
Back-Scattered Transponder—Synonymous with "Non-Radiating Transponder". Communicates by de-tuning an antenna and does not induce or radiate power in the antenna.
Transceiver—A radiating radio tag that actively receives digital data and actively transmits data by providing power to an antenna. May be active or passive.
Passive Transceiver—A radiating radio tag that actively receives digital data and actively transmits digital data by providing power to an antenna, but does not have a battery and in most cases does not have a crystal or other time-base source.
Active Transceiver—A radiating radio tag that actively receives digital data and actively transmits data by providing power to an antenna, and has a battery and in most cases a crystal or other internal time base source.
Inductive Mode—Uses low frequencies, 3-30 kHz VLF or the Myriametric frequency range, 30-300 kHz LF the Kilometric range, with some in the 300-3000 kHz, MF or Hectometric range (usually under 450 kHz). Since the wavelength is so long at these low frequencies over 99% of the radiated energy is magnetic as opposed to a radiated electric field. Antennas are significantly (10 to 1000 times) smaller than the ¼ A wave length or ⅒ wave length that would be required to radiate an electrical field efficiently.
Electromagnetic Mode—As opposed to Inductive mode radiation above, uses frequencies above 3000 kHz, the Hectometric range typically 8-900 MHz where the majority of the radiated energy generated or detected may come from the electric field and a ¼ wave or ⅒ length antenna or design is often possible and is used. The majority of radiated and detected energy is an electric field.

Figure 3:
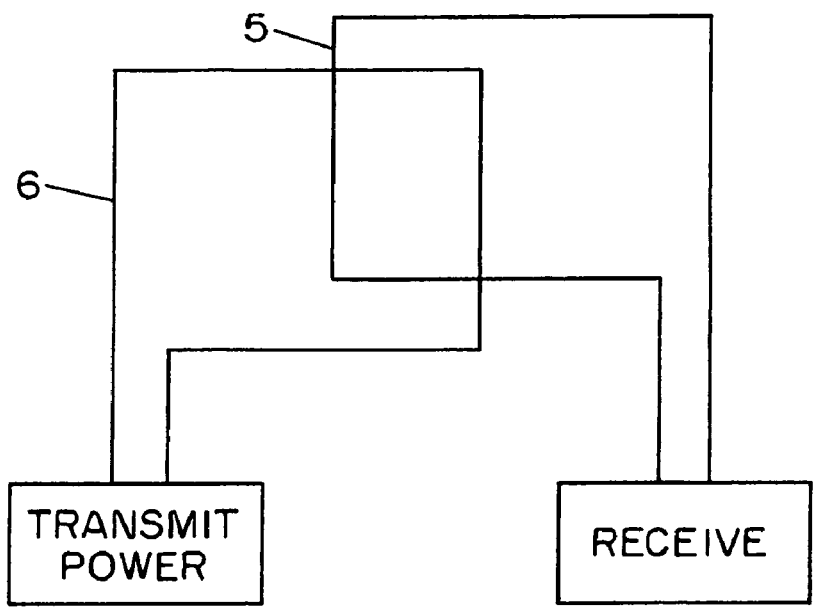
FIG. 3 shows a prior-art coil arrangement to decouple two antennas.
Figure 4:
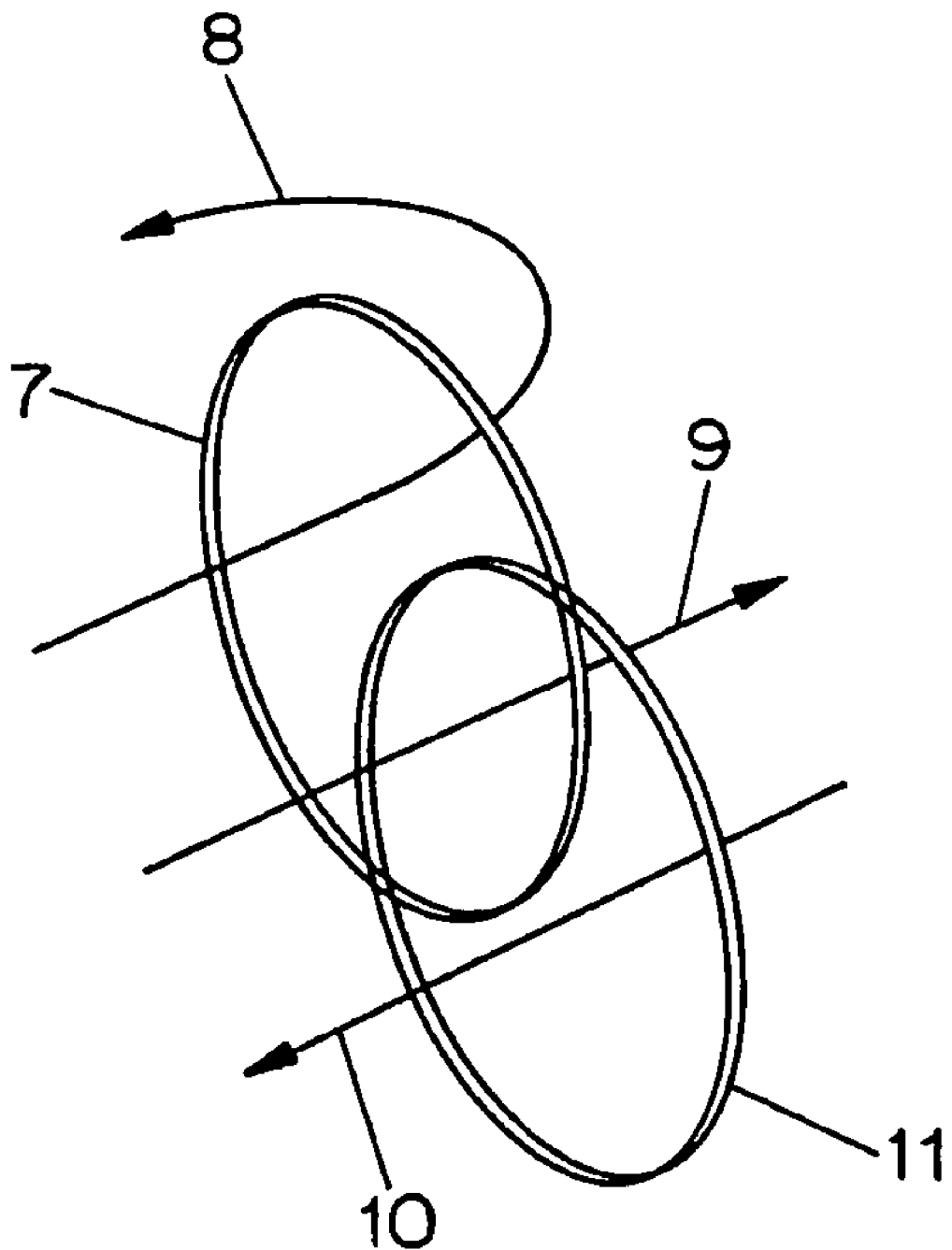
FIG. 4 illustrates the principle that leads to decoupled antennas.

Referring to FIG. 4, we show the principle that leads to decoupled antennas. The flux lines are shown for the arrangement in FIG. 3. Coils 7 and 11 are shifted. Flux between coils goes in one direction through center and the opposite direction outside of the coil. By shifting the position of the coils, the opposing flux lines from coil 7 and 11 may be used to null out the field so they are nearly 100% decoupled.

Figure 5:
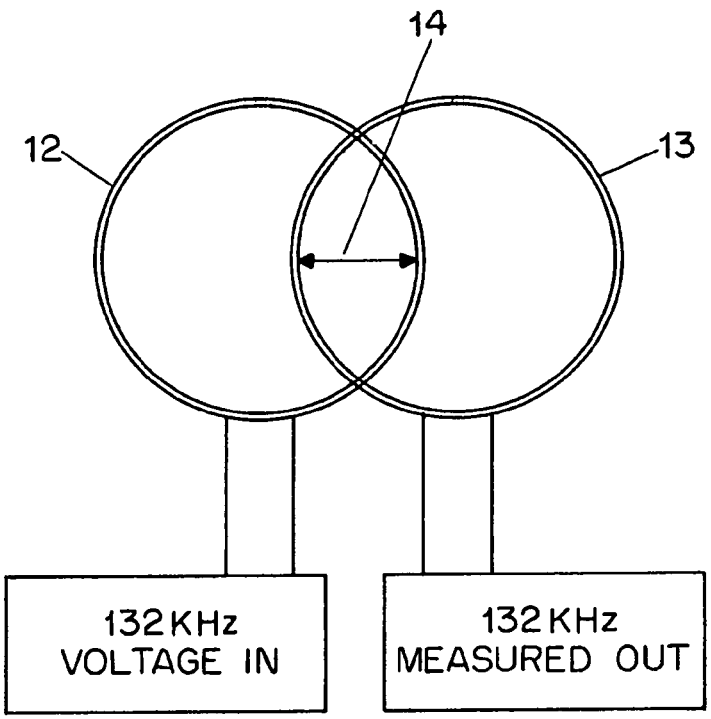
FIG. 5 shows the practical ability to null out the antenna fields.
Figure 5:
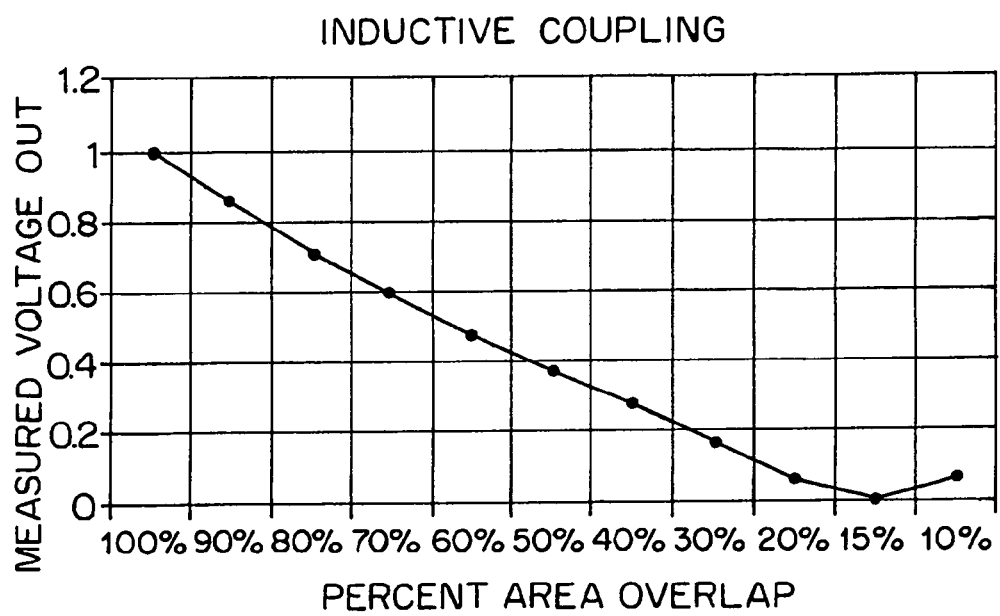

FIG. 5 shows the practical ability to null out the fields. In this case a signal of 132 kHz was applied to coil 12 and the voltage was measured on a high-impedance oscilloscope from coil 13. The graph below shows measured voltage in coil 13 as a function of distance D (14). The graph has converted D to a percent-overlap figure. At 15% overlap the induced voltage is near zero.

Figure 6:
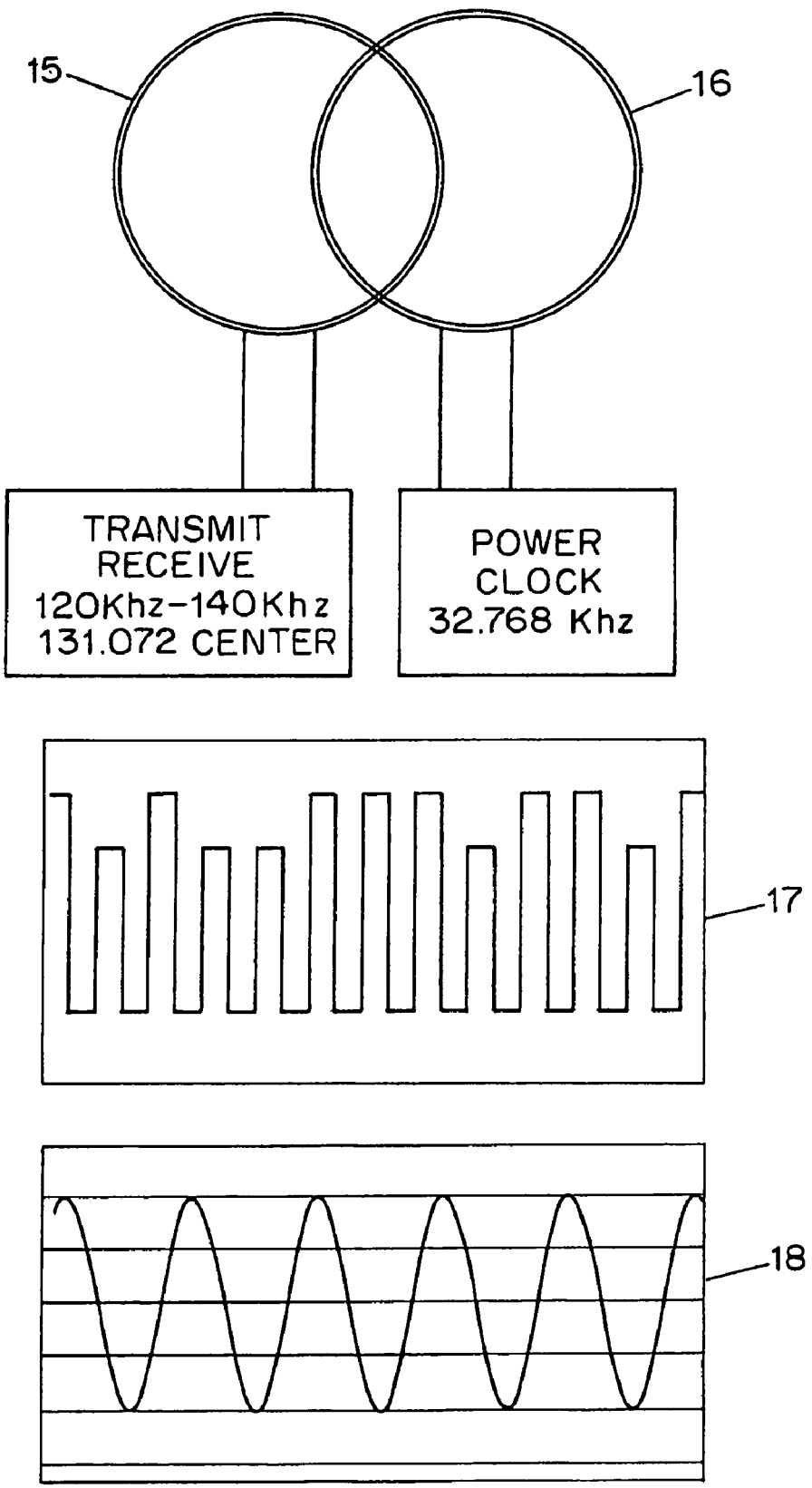
FIG. 6 shows coplanar antennas similar to those of FIG. 4 and FIG. 5, shifted in the system according to the invention.

FIG. 6 shows the co-planar antennas similar to that shown FIG. 4 and FIG. 5 (15 and 16), shifted in the system so the two coils are decoupled. However, coil 15 is used for half-duplex send and receive communication, and coil 16 is used for a carrier that provides power and a time base only. Coil 16 provides for a data-free channel, with power and clock only. One of the advantages of his arrangement is that the two coils may be tuned to different frequencies for optimal performance. The power channel can be low frequency where more power is permitted by federal regulations and the coil may be narrowly tuned with a high Q so that maximum power is transferred to the radio tag. The coil for the data channel (15) may be poorly tuned (low Q) and use a higher frequency centered at a harmonic of the power channel frequency. One advantage of the higher frequency is that higher data rates are possible. The advantage of a low-Q coil or zero Q—(not tuned) antenna is that a broadband data protocol (shown as square wave in 17) may be used creating what might be called a "poor man's spread spectrum" communications system. This makes the radio tag more reliable, even when near noise, at a low cost. A second advantage of a low-Q coil for the data channel is that when these tags are placed near steel or conductive metals at these frequencies the primary effect is that the coil is detuned. This detuning becomes more severe as frequency increases, as well as with the Q of the coil. With a low-Q coil and a high-gain amplifier (see below) on the radio tag, the effects of the steel are minimized. Stated differently, it is harder to detune a low-Q coil.

An additional feature and exemplary embodiment is to use frequencies that are harmonics of a 32.768-kHz watch crystal. The advantage is that the same radio tag may be converted to an active tag with a low-cost battery and low-cost crystal directly replacing the power channel (16). An additional advantage is that once the power channel has been activated, such an active tag and a passive tag may freely communicate.

Figure 7:
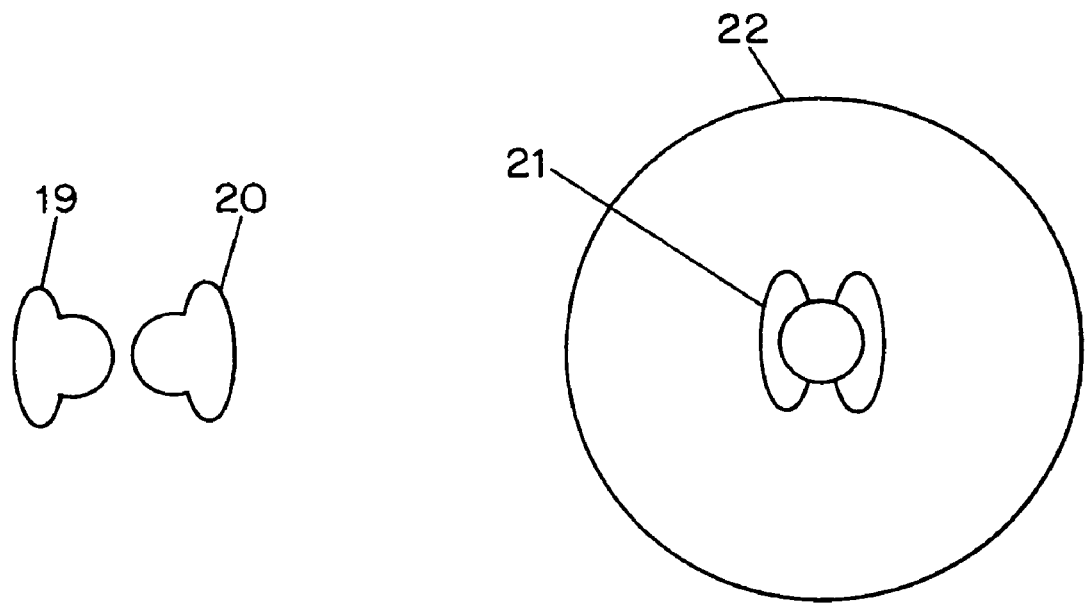
FIG. 7 shows in plan view an example application and design of a coplanar antenna on a compact disk.

FIG. 7 shows an exemplary application and design of a coplanar antenna on a compact disk (CD). The two antennas (19 and 20) are placed on a CD 22 so the center area 21 is clear but the coils are decoupled.

Figure 8:
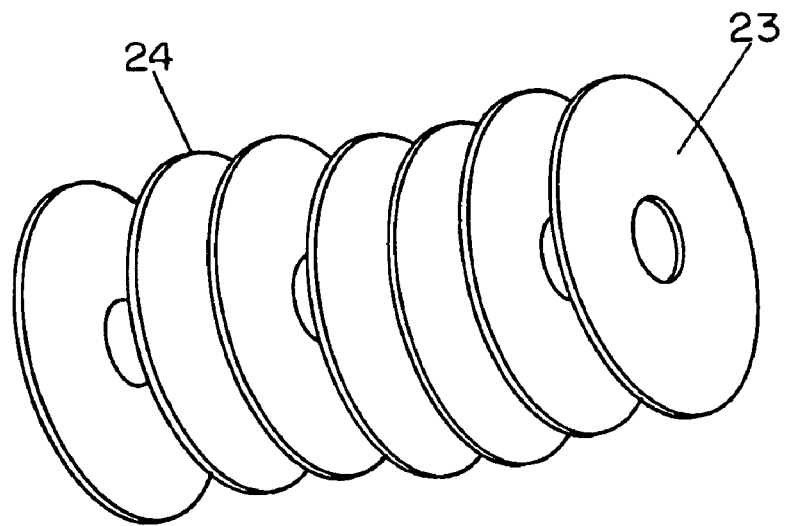
FIG. 8 shows a stack of CDs.

One of the major problems with CDs is the aluminum conductive coat placed in the middle of the disk, in some cases in several layers, which can block higher frequency radio tags especially those that use backscattered communication mode. It can also lead, especially in a stack, to detuning of low-frequency tags. One of the advantages of the isolated power and data communication channels is the fact that the tag may function in a stack 24 of CDs 23, as shown in FIG. 8.

Figure 9:
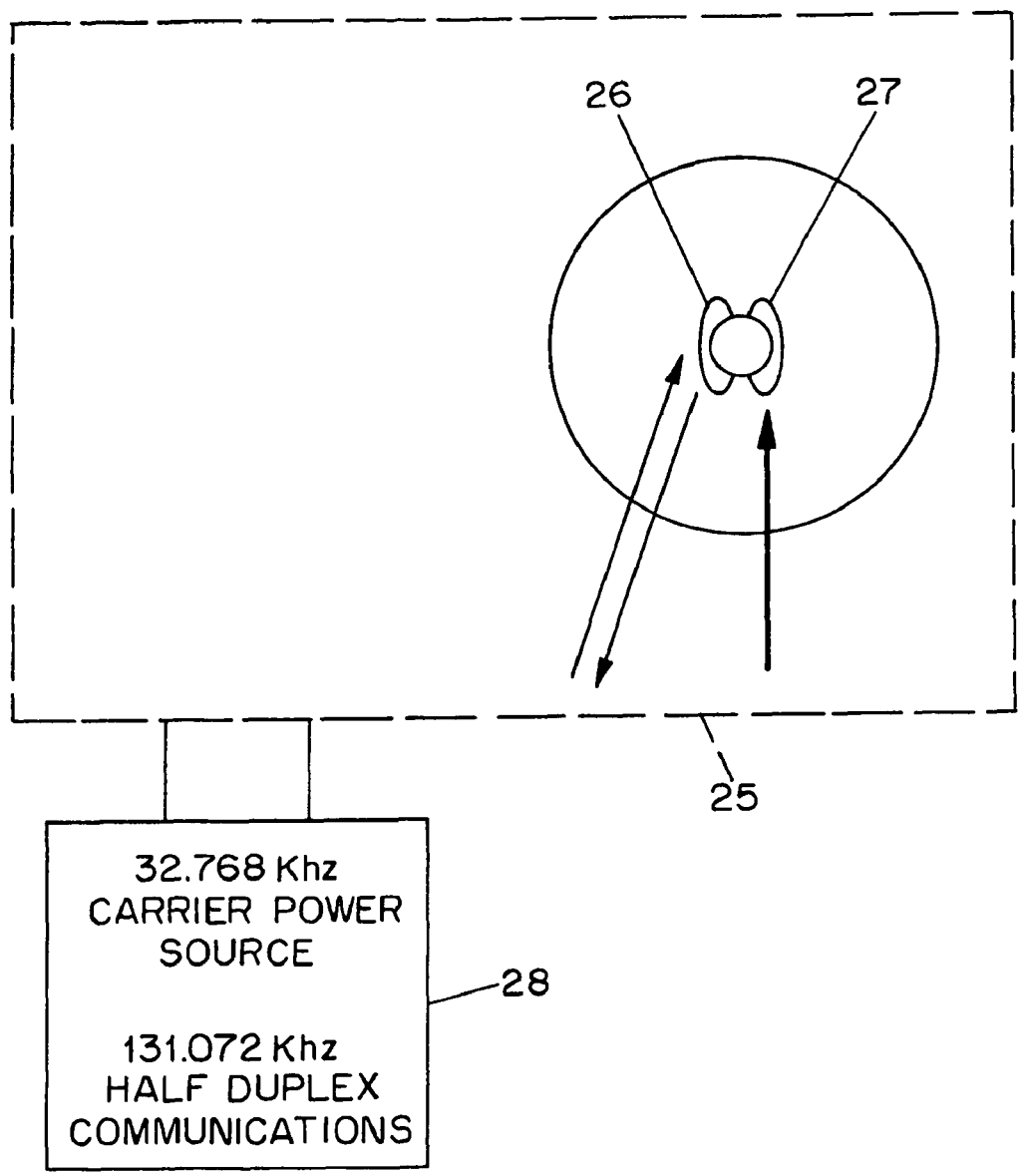
FIG. 9 shows a single antenna by which a base station may have both the power carrier and the data communications channel integrated and placed on a single antenna.

With a number of CDs such as described above, the base station may have both the power carrier and the data communications channel integrated and placed on a single antenna as shown in FIG. 9. The antenna 25 is a single tuned inductive loop antenna similar to that described in U.S. Pat. No. 4,937,586 (Radio Broadcast Communication Systems With Multiple Loop Antennas, 1990) around shelves or in an open area. The antenna provides both low-frequency power and high-frequency data communications signals. This approach is developed further below in connection with FIG. 32.

Figure 10:
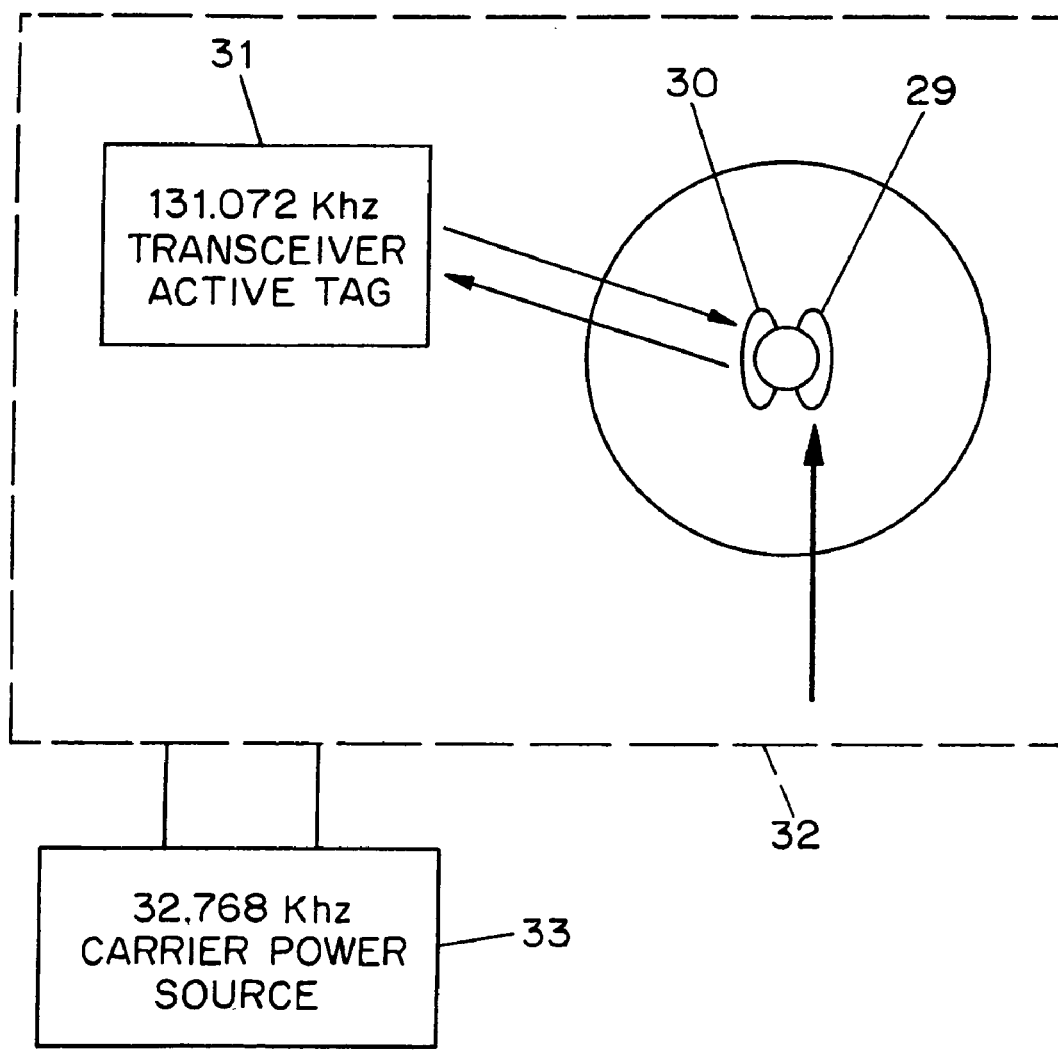
FIG. 10 shows an alternate mode of operation providing power with a loop similar to FIG. 9, and an active tag near the passive tag interrogating the passive tag.

FIG. 10 shows an alternate mode of operation. In this arrangement, power is provided with a loop similar to FIG. 9, and an active tag 31 near the passive tag may interrogate the passive tag. This makes the active tag design simple with a long battery life, since it does not have to provide the carrier required to provide power to the passive tag. This makes it possible to use low-cost Li batteries in the active tag 31, and it has a 10-15 year battery life.

Figure 11:
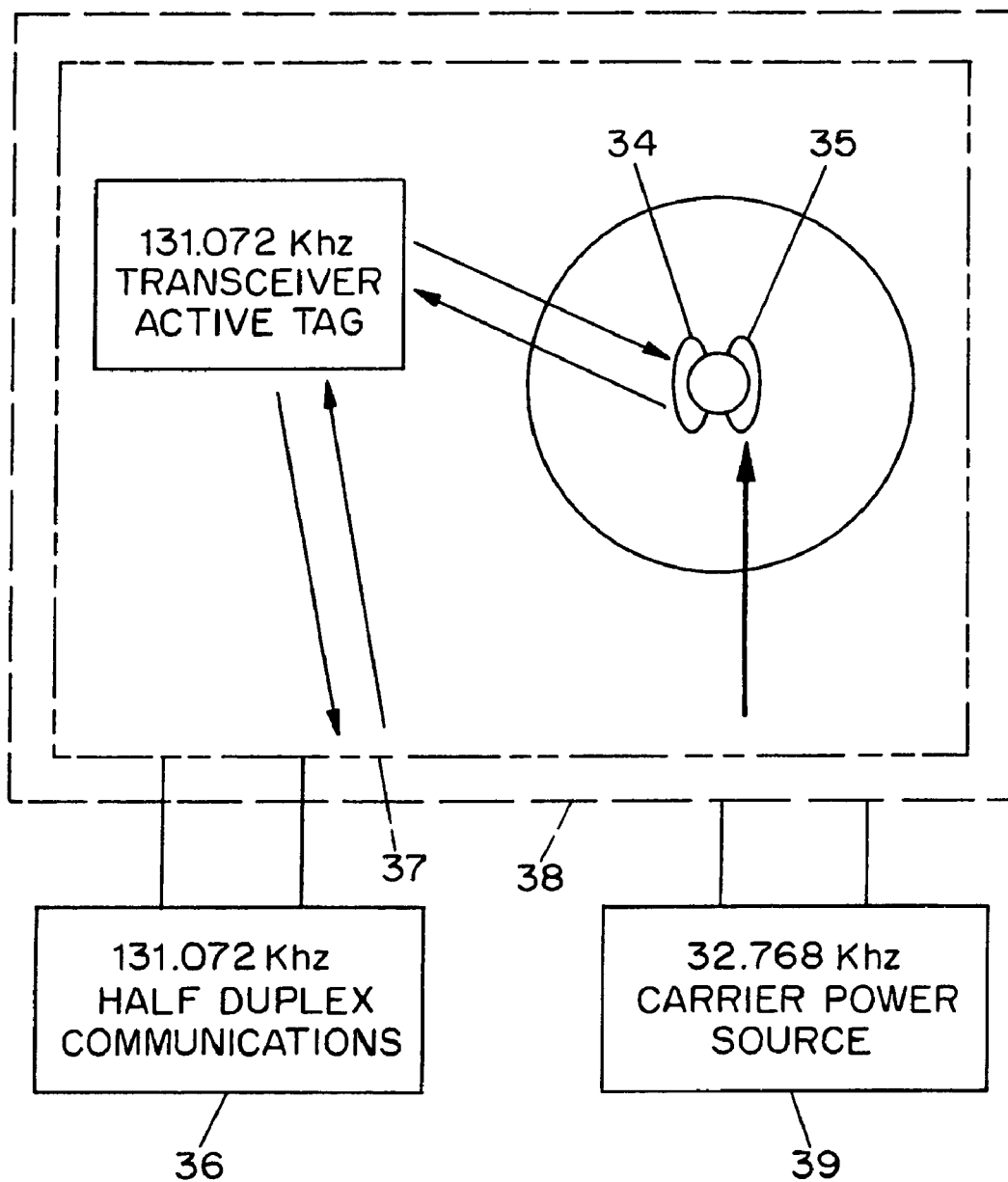
FIG. 11 shows a configuration similar that shown in FIG. 10 in which an independent base station provides data communication to both the passive and the active tag with an independent antenna.

FIG. 11 shows yet another mode of operation similar to that shown in FIG. 10. An independent base station provides data communication to both the passive and the active tag with an independent antenna 32. An independent power module has its own antenna that may be always on providing power and clock to the passive tags. The active tag may in some cases have a fixed location, on a shelf for example. Since the communication range between the active tag and the passive tag is limited to a few feet, this arrangement may be used to locate passive tags within that range within a large loop antenna's area. Thus, the base station may interrogate the active tag to see if it received a signal from a passive tag. If it did, then it is known that the passive tag is within a few feet of the particular active tag. The approaches of FIGS. 10 and 11 are developed further below in connection with FIG. 33.

Figure 12:
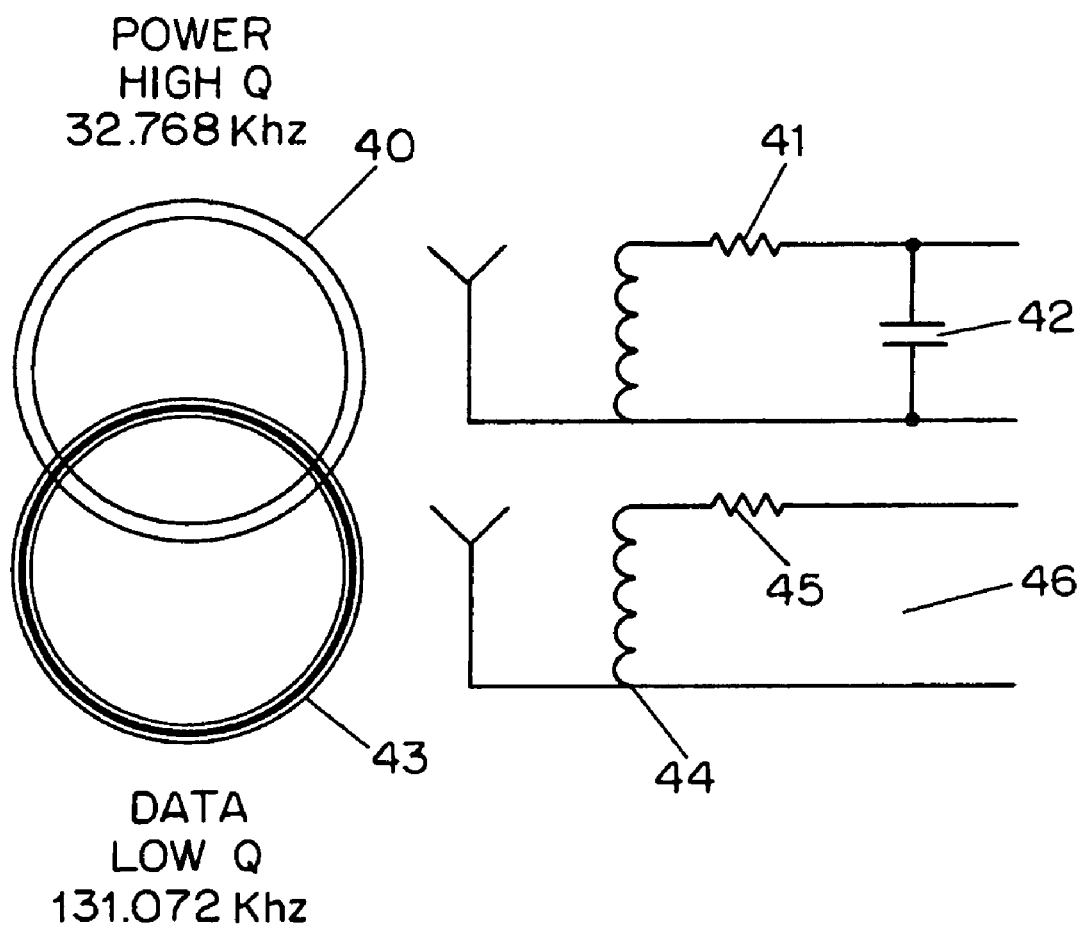
FIG. 12 shows two antennas (40, 43) on the passive radio tag placed in position so they are not inductively coupled, with differing Q.

FIG. 12 shows two antennas (40, 43) on a passive radio tag which are placed in a position so they are not inductively coupled. In addition, the power coil 40 has a high Q to maximize power transfer to the radio tag. The data antenna 43 is poorly tuned, or not tuned at all, with a very low Q (e.g., no tuning capacitor). An FET transistor located on the chip amplifies the incoming signal as well as the outgoing data.

Figure 1:
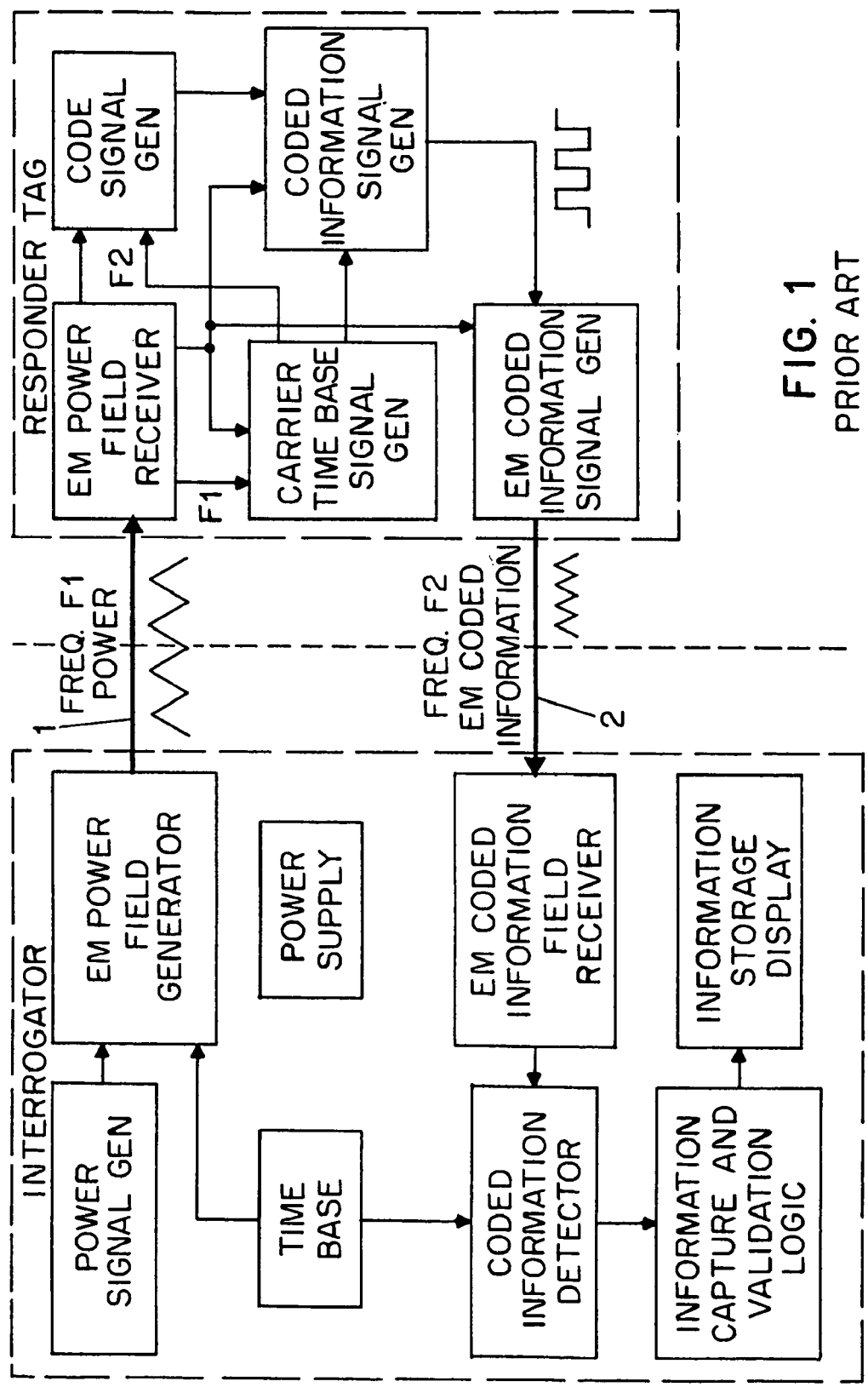
FIG. 1 shows a prior-art functional block diagram.
Figure 2:
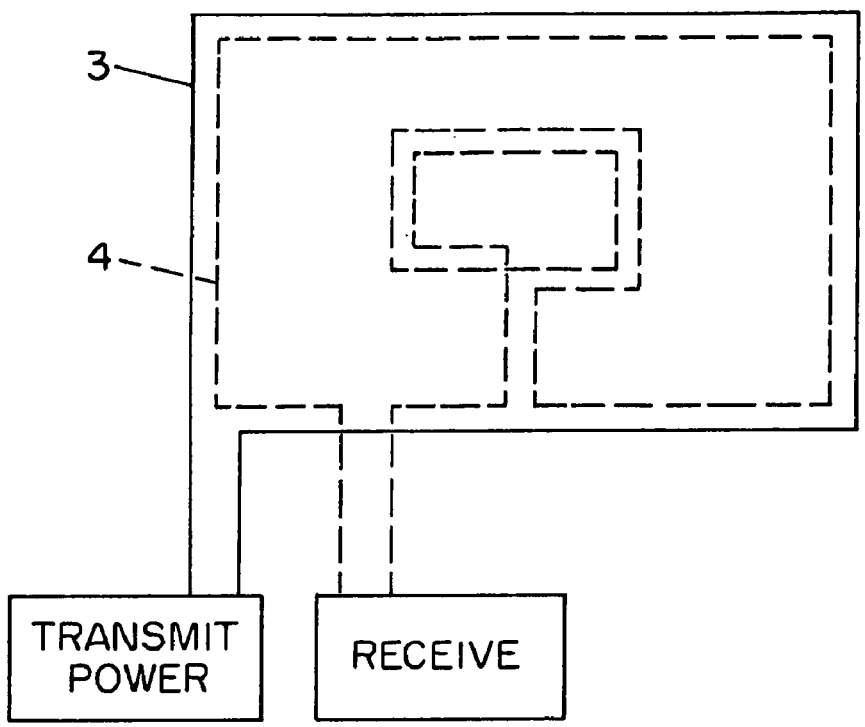
FIG. 2 shows a prior-art arrangement and method to decouple two antennas.
Figure 13:
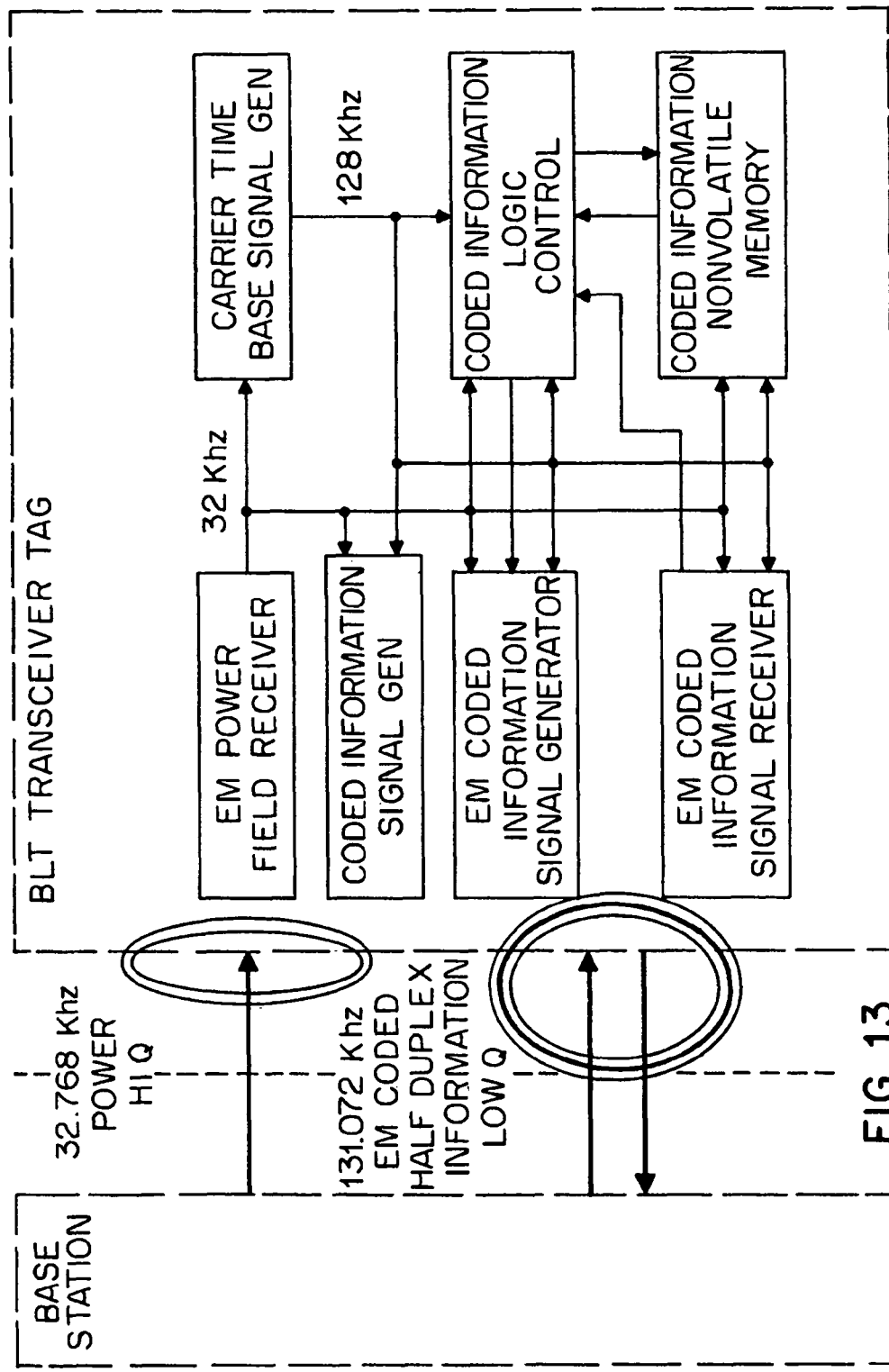
FIG. 13 shows a block diagram similar to that of FIG. 1 showing differences in the invention over the prior art.

FIG. 13 is a block diagram similar to FIG. 1, but showing differences in the invention over the prior art. The high-Q antenna is used only for time-base generation and power. In the exemplary embodiment the frequency is the same as a watch crystal—32.768 kHz. The power antenna is data- and information-free. The low-Q antenna is a higher harmonic—in the exemplary embodiment 131.072 kHz—and transmits half-duplex data. Optional sensors for temperature similar to U.S. Pat. No. 3,713,124, Temperature Telemetering Apparatus, 1973) may be added for applications that require temperature tracking.

Key to this circuit is the Carrier Time Base Signal Generator. According to an embodiment of the invention, a ceramic filter is used to multiply a 50 kHz signal nine times to get frequency regeneration for the 450 kHz data-out signal. However to keep manufacturing costs low in the passive version of the tag, external components have been eliminated. A phase-locked loop could also be used as suggested in the prior art, however, power consumption in both the active and passive tag would be unacceptably high. Therefore, a special multiplier circuit had to be designed (see FIG. 15) to minimize power consumption. U.S. Pat. No. 4,937,586, Radio Broadcast Communication Systems With Multiple Loop Antennas, used a similar two-frequency system, however the carrier for power was higher so that a simple divider was required to create the communications carrier and data stream. Another embodiment of this aspect of the invention is discussed below in connection with FIG. 22.

Figure 14:
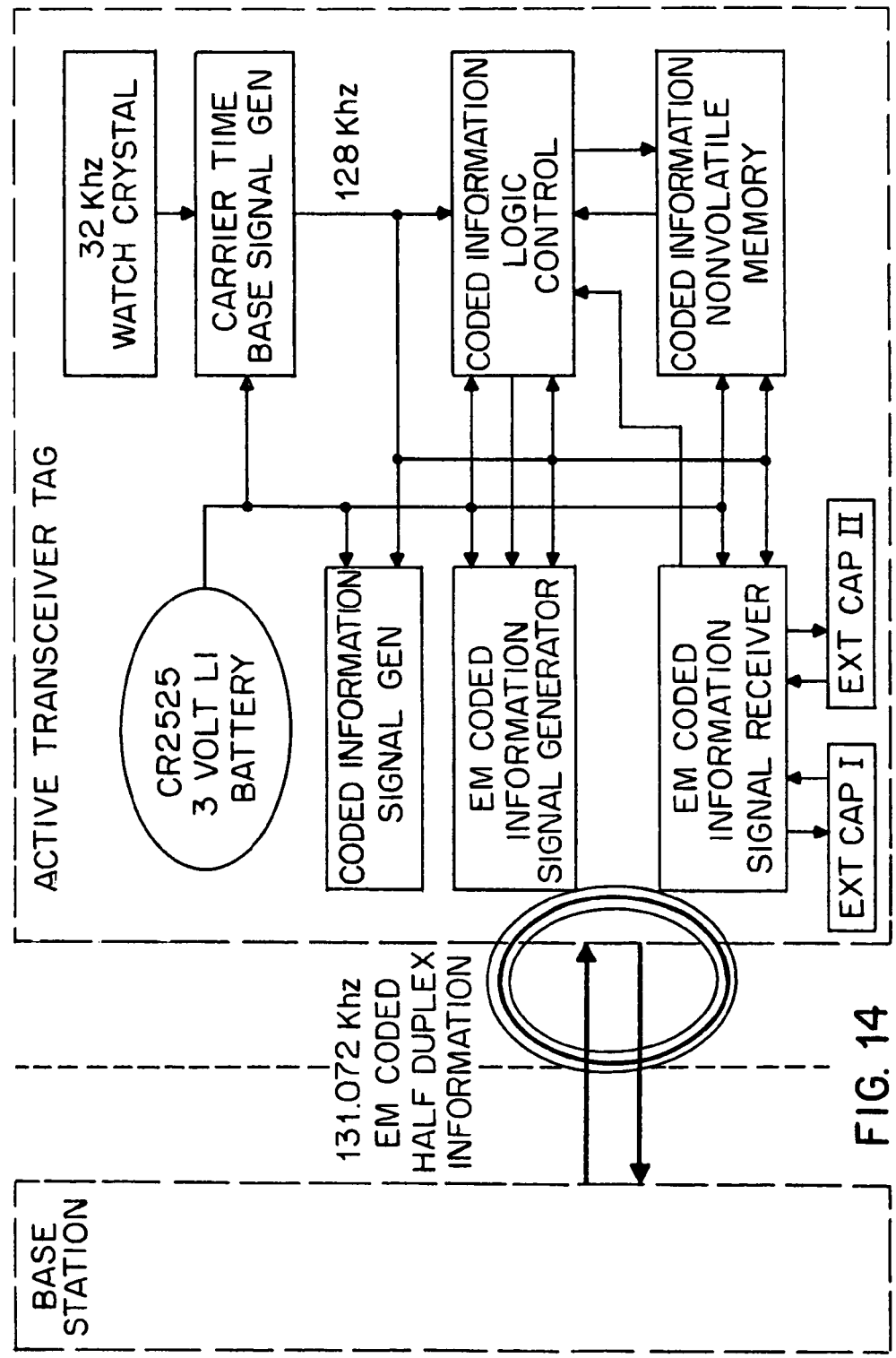
FIG. 14 shows the block diagram of FIG. 13, but with the power coil replaced by a battery and a standard watch crystal.

Turning to FIG. 14, one of the advantages of this design is that the power coil can optionally be replaced by a battery and a standard watch crystal, both low in cost, and an active tag can be created that has much longer range, with a long battery life. Li batteries can cost as low as five cents and watch crystals cost also fewer than five cents. While the tag is larger, it has many applications and can communicate with the passive version of the tag. Optionally, sensors can be added that can be used to maintain a data log in these tags. LED's can be added to identify a tag for pick-and-place applications. Optional external capacitors can be added that make it possible to have a higher-gain amplifier for both receiving and transmitting. LCD displays can be added to display price in retail setting or other information. Thus, a fully integrated system can be created that can provide visibility for inventory, using the passive tag with an active tag that might have a display (similar to that described in U.S. Pat. No. 4,879,756, Radio Broadcast Communication Systems, 1989) to display price and or stock levels. In addition both the active tag and the passive tag may be useful in an EAS system to prevent pilferage.

Figure 15:
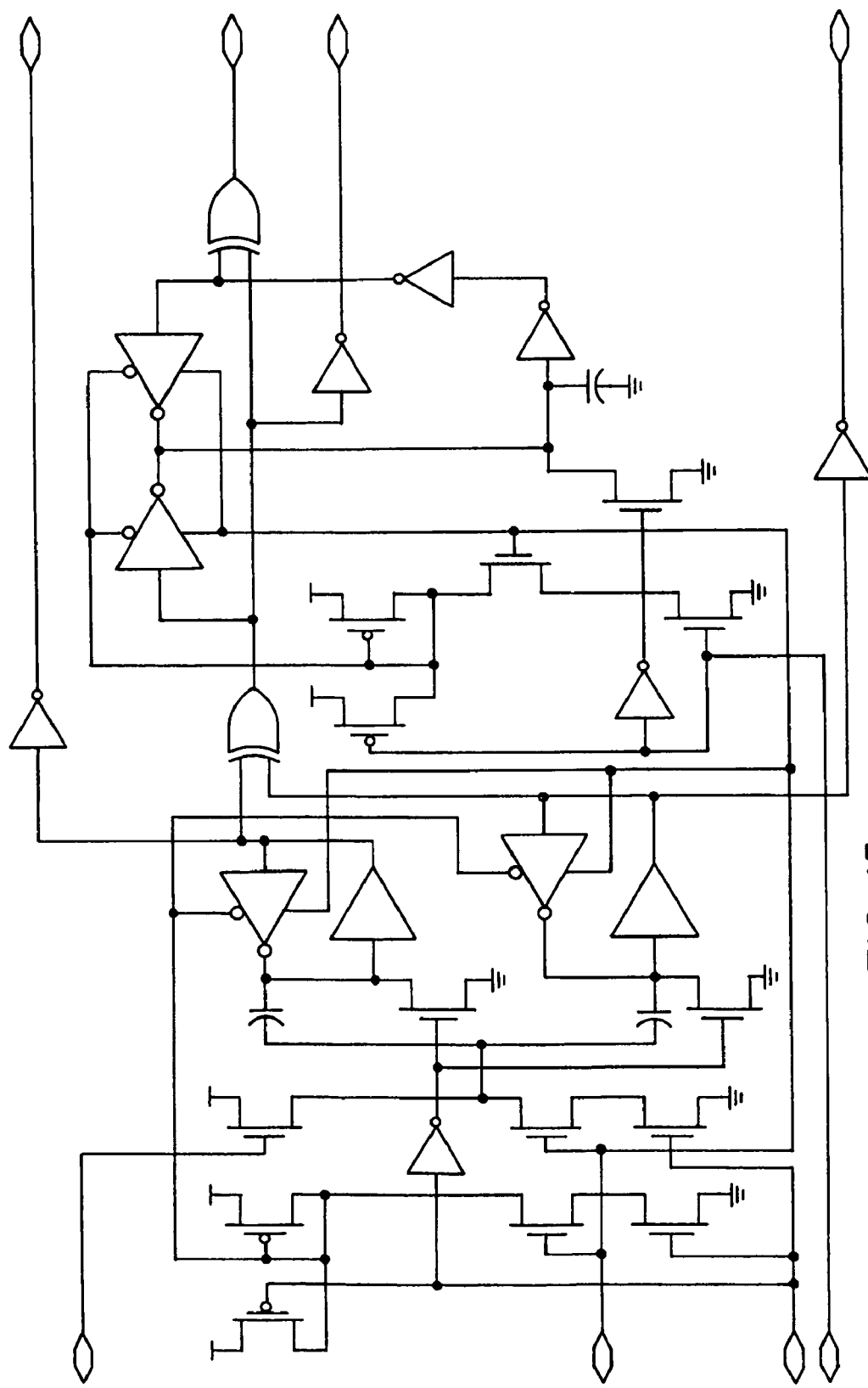
FIG. 15 shows in schematic form a multiplier circuit that makes possible the use of a low frequency power time base carrier.

FIG. 15, as mentioned above, is a multiplier circuit that makes possible the use of a low frequency power time base carrier. It also makes use of a 32.768-kHz crystal possible in an active tag.

Figure 16:
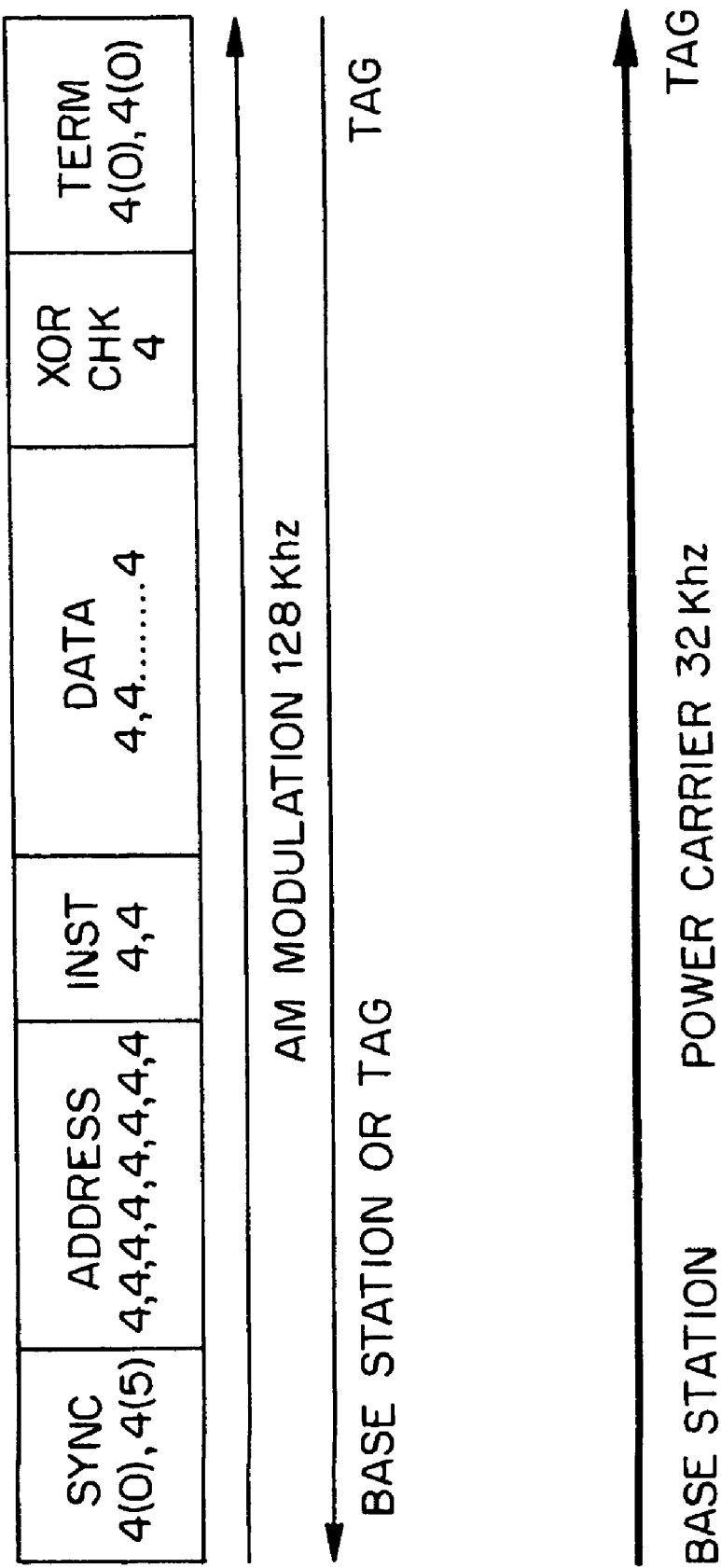
FIG. 16 shows an exemplary protocol for the tags.

FIG. 16 shows a standard protocol for the tags. In the exemplary embodiment AM (normally called ASK or "amplitude shift keying") modulation is used over FSK or other frequency-dependent methods for several reasons. The circuitry to decode and encode AM is simple. A wide bandwidth signal is useful to maximize data detection so it functions as a spread-spectrum system. Optionally, PSK may be used as well because of its higher reliability in high-noise environments. Both PSK and AM have better channel data rates then FSK so are much more useful at lower frequencies when bandwidth and data rate is an issue.

Figure 17:
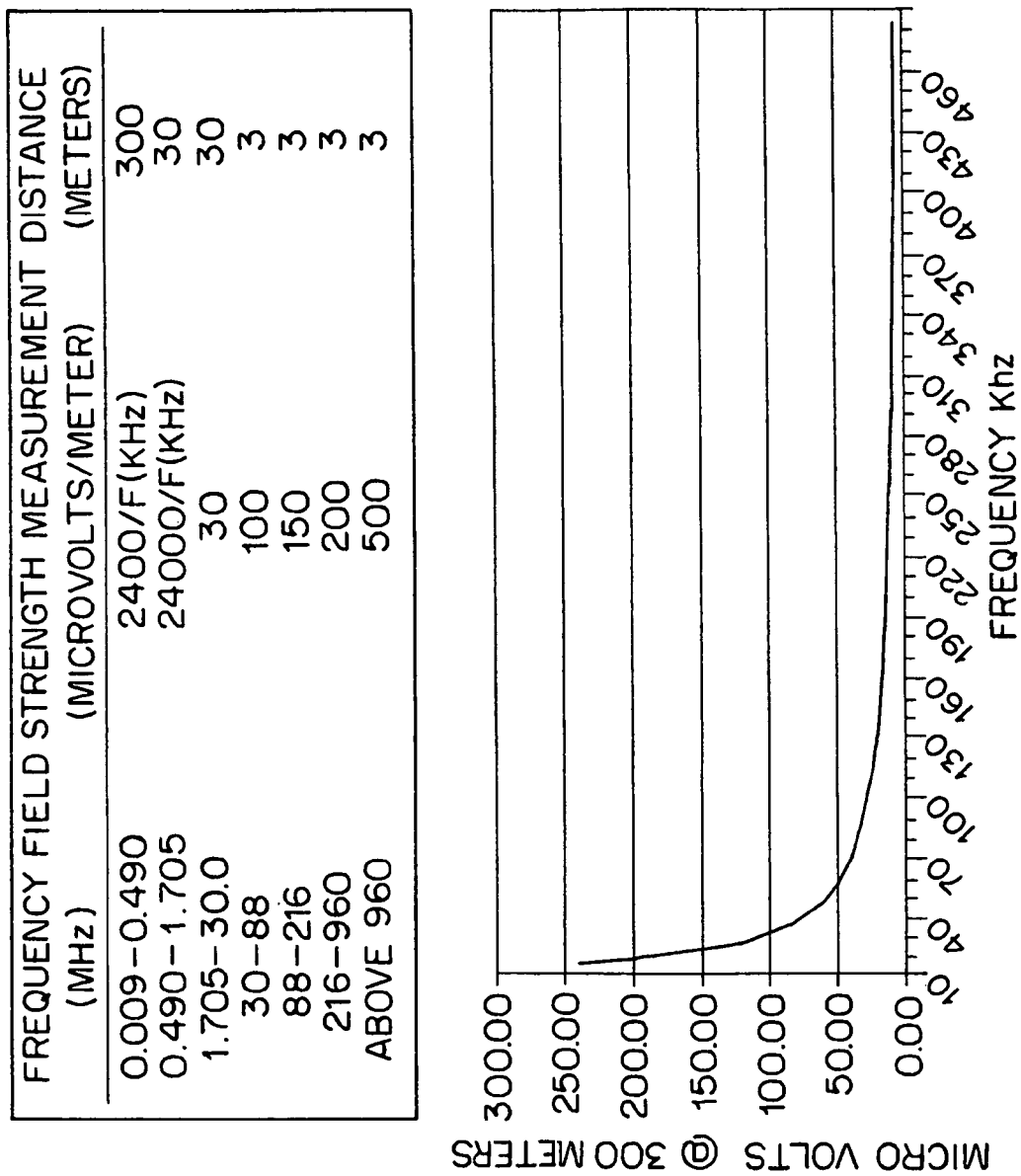
FIG. 17 shows field strength as a function of distance.

FIG. 17 depicts graphically one additional advantage of using a lower frequency as the power carrier (over U.S. Pat. No. 4,879,756, Radio broadcast Communication Systems, 1990), namely that power limits imposed by the FCC Part 15 regulations are given as a function of frequency from 9 kHz to 1.705 MHz. In addition the distance to make Part 15 measurements below 490 kHz is 300 meters. The graph below shows the number of microvolt under Part 15 that is acceptable. The graph shows the advantage of using low frequencies below 70 kHz for transfer of maximum power.

Figure 18:
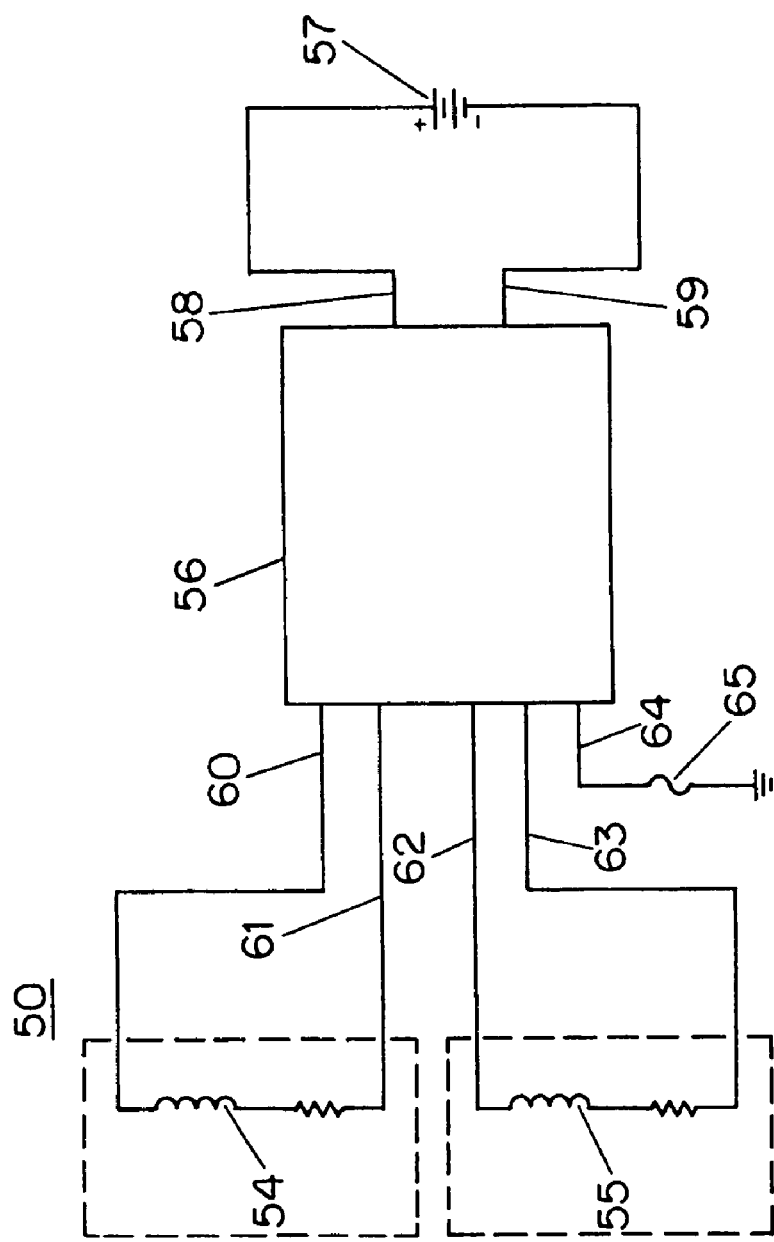
FIG. 18 shows a top-level system diagram for a transponder or tag 50 according to the invention, including chip 56.

As may be seen in FIG. 18, the device 51 that interacts with the tag 40 is modeled as a voltage source 53 coupled to an antenna 52, in this exemplary embodiment having an inductance of 100 micro Henries. The device 51, in a simple case, is a single base station as shown in FIG. 9. In the more general case, however, the device 51 is a combination of a power transmitting station 33 (FIG. 10) and one or more active tags 31. Still more generally, the device 51 may be a base station interacting with the tag 50 (from FIG. 18), as well as one or more active tags interacting with a tag (FIG. 11).

The tag 50 has a first antenna 54 connected to a chip 56 by leads 60, 61. This antenna 54 supplies power to the chip 56 during times when antenna 54 is bathed in suitable excitation RF energy. Antenna 54, in an exemplary embodiment, has an impedance of 16 millihenries with a nominal resistance of 420 ohms.

The tag 50 has a second antenna 55 connected to the chip 56 by leads 62, 63. This antenna 55, when the chip 56 is in receive mode, supplies data to the chip 56. When the chip 56 is in transmit mode, the antenna 55 transmits the data as an RF signal based upon a drive signal from the chip 56. Antenna 55, in an exemplary embodiment, has an impedance of 16 millihenries with a nominal resistance of 420 ohms.

In an exemplary embodiment each of the tag coils is about 1 inch in diameter and is about 300 turns of copper wire.

An optional battery 57, in an exemplary embodiment, a three-volt lithium cell, may be connected to the chip 56 by leads 58, 59.

In one exemplary embodiment the power RF energy (excitation energy) bathing the antenna 54 is at 131 kilohertz, and the return data transmitted via antenna 55 is at 256 kilohertz. In another exemplary embodiment, the excitation energy is 65536 Hz and the return data is at 131072 Hertz. If it is determined that external components can be used, such as capacitors on the antennas 54, 55, lower frequencies might be used such as an excitation signal.

An EAS (electronic article surveillance) fusible link 65 is connected to the chip 56 by lead 64. This link is present (is electrically conductive) from the factory. At a later time, for example at the time of purchase of a product, the link can be "blown" by application of an appropriate field or signal.

Figure 19:
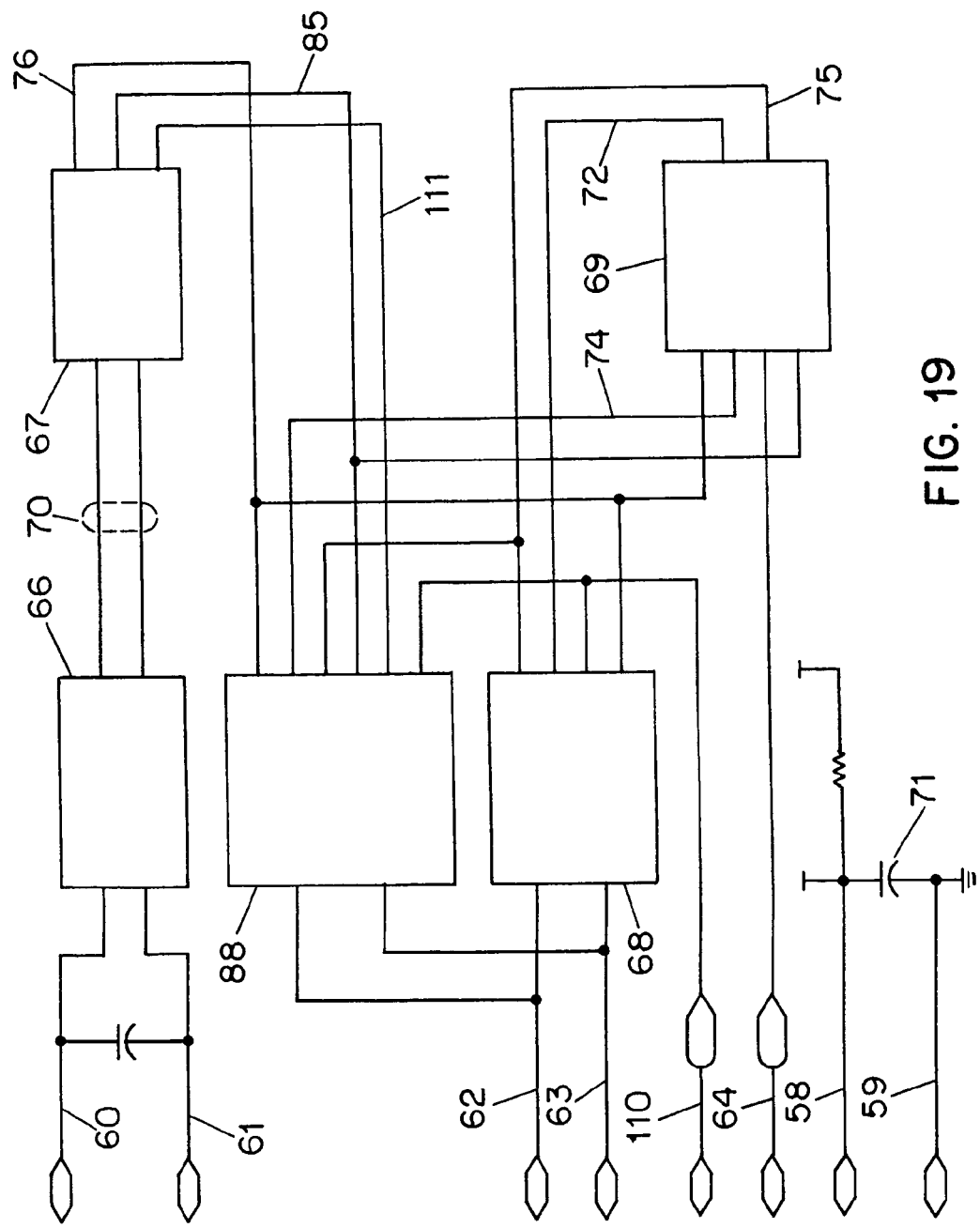
FIG. 19 shows the chip 56 of FIG. 18 in greater detail, including rectifier 66, RF transmit driver 68, analog portions 67 and 88 and logic portion 69.
Figure 20:
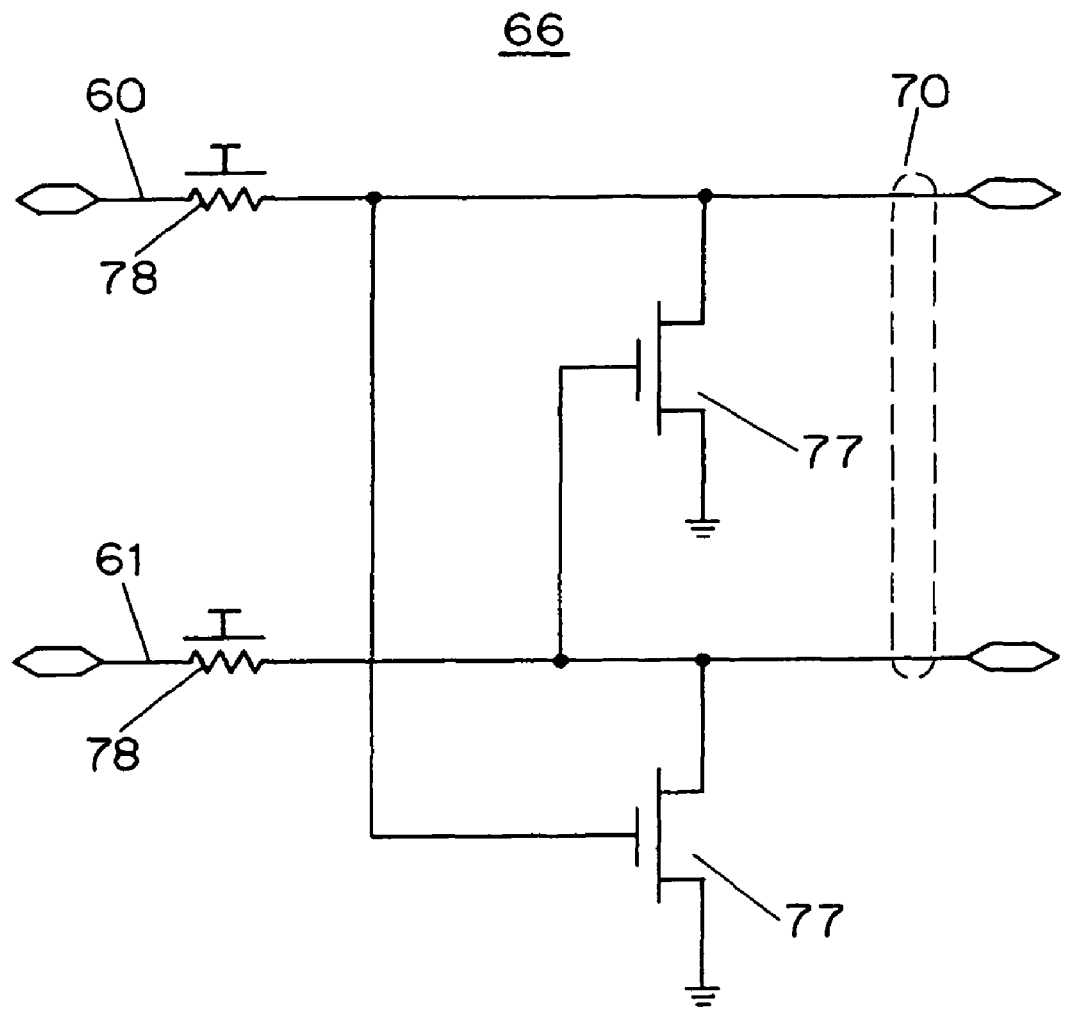
FIG. 20 shows rectifier 66, first introduced in FIG. 19, in more detail.
Figure 21:
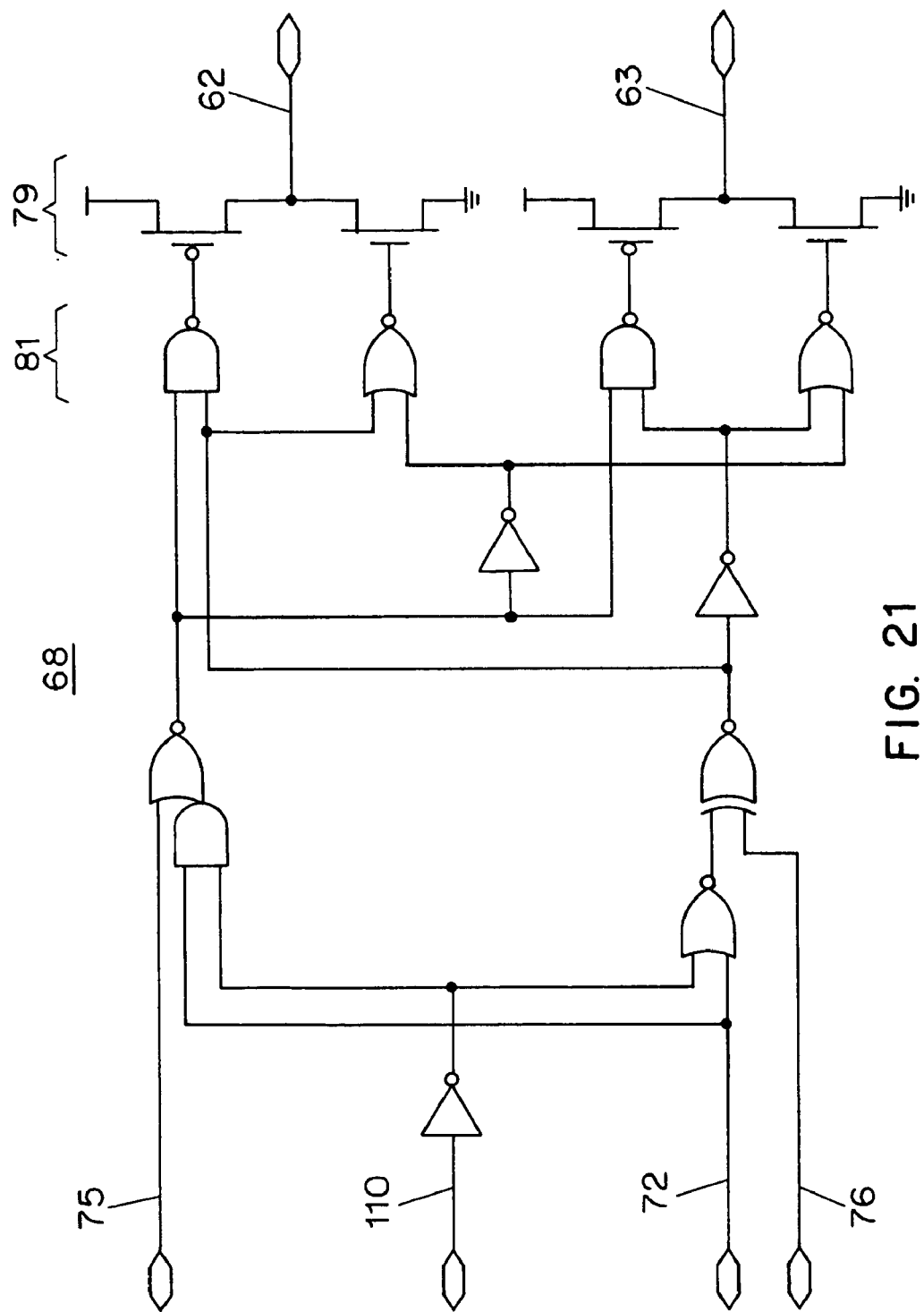
FIG. 21 shows transmit driver 68, first introduced in FIG. 19, more detail.

FIG. 19 shows the chip 56 of FIG. 18 in greater detail. Power enters the chip 56 by leads 60, 61 and passes to rectifier 66, about which more will be said later in connection with FIG. 20, and rectifier 66 also provides clock signals on clock leads 70. An RF transmit driver 68 may be seen and will be discussed in more detail in connection with FIG. 21.

If optional battery power is provided at leads 50, 59, this power is filtered by bypass capacitor 71 and is provided to the rest of the chip at VDD.

The balance of the circuitry of chip 56 is grouped into analog portions 67 and 88 and logic portion 69, about which more will be said later. Analog portion 67 is discussed in more detail in connection with FIG. 22. Analog portion 99 is discussed in more detail in connection with FIG. 25. Logic portion 69 is discussed in more detail in connection with FIG. 26. Line 111 (NREF) is a reference voltage for various .N-channel MOSFETs used in the analog portions of the chip.

Transmit path. Sometimes logic 69 will wish to transmit data external to the tag 50 by means of antenna 55 (FIG. 18). To do this, transmit enable line 75 is asserted and a serial data signal is sent on line 72, both to driver circuitry 68, about which more will be said later in connection with FIG. 21. The transmit signal line 72 is passed through the driver to leads 62, 63 and thence to antenna 55 (FIG. 18).

Receive path. An RF signal received by antenna 55 (FIG. 18) passes to receiver 88. The received serial data signal then passes on line 74 to logic portion 69.

EAS line. The EAS line 64 connects to logic portion 69, and is preferably protected by an electrostatic discharge element.

PMAM line. The PMAM line 110 connects to receiver 88 and to driver 68, and is preferably protected by an electrostatic discharge element. This line determines whether the chip 56 transmits and receives in AM (amplitude modulation) or PM (phase modulation). Each modulation has advantages and disadvantages. PM often offers a greater range, namely communication at a greater distance, as compared with AM.

Clock. A clock signal is provided by analog portion 67 by line 76 to the logic portion 69, to the receiver 88, and to the driver circuitry 68.

Power-on-reset. It is important that the logic portion 69 and receiver 88 each commence their activities in a predictable initial state. For this reason, the analog portion 67 develops a power-on-reset signal 85 which resets the logic portion 69 and the receiver 88. The details of the development of this signal are discussed below in connection with FIG. 23.

Summarizing the rest of the lines to and from logic portion 69, an EAS signal 64 from a fusible link is provided to logic portion 69. In the event that logic portion 69 wishes to transmit data external to the tag 50, it does so on lines 72, 75. Power VDD and VSS are provided to logic portion 69 by connections omitted for clarity in the figures just discussed.

Rectifier 66. Rectifier 66, introduced in FIG. 19, is shown in more detail in FIG. 20. RF energy arrives on leads 60, 61 and reaches rectifiers 78. In an exemplary embodiment the chip 56 is fabricated from P-well technology and the rectifiers 78 simply provide rectified voltage to appropriate substrates of the chip. Energy also passes to FETs 77 where a pair of bridge-rectified clock signals (half waves, differing by 180 degrees in phase) is developed to be propagated elsewhere on lines 70.

Transmit driver 68. The transmit driver 68, introduced in FIG. 19, is shown in more detail in FIG. 21.

Transmit path. Transmit enable line 75 is asserted. The serial data signal to be transmitted arrives on line 72, and is clocked via clock line 76 to a push-pull driver. The driver is composed of buffers 81, and exemplary FET driver transistors 79 in a push-pull fashion. This provides energy at leads 62, 63 and thence to antenna 55 (FIG. 18). The PMAM (phase modulation or amplitude modulation selection) line 110 determines whether the transmitted signal is phase modulated or amplitude modulated.

Figure 22:
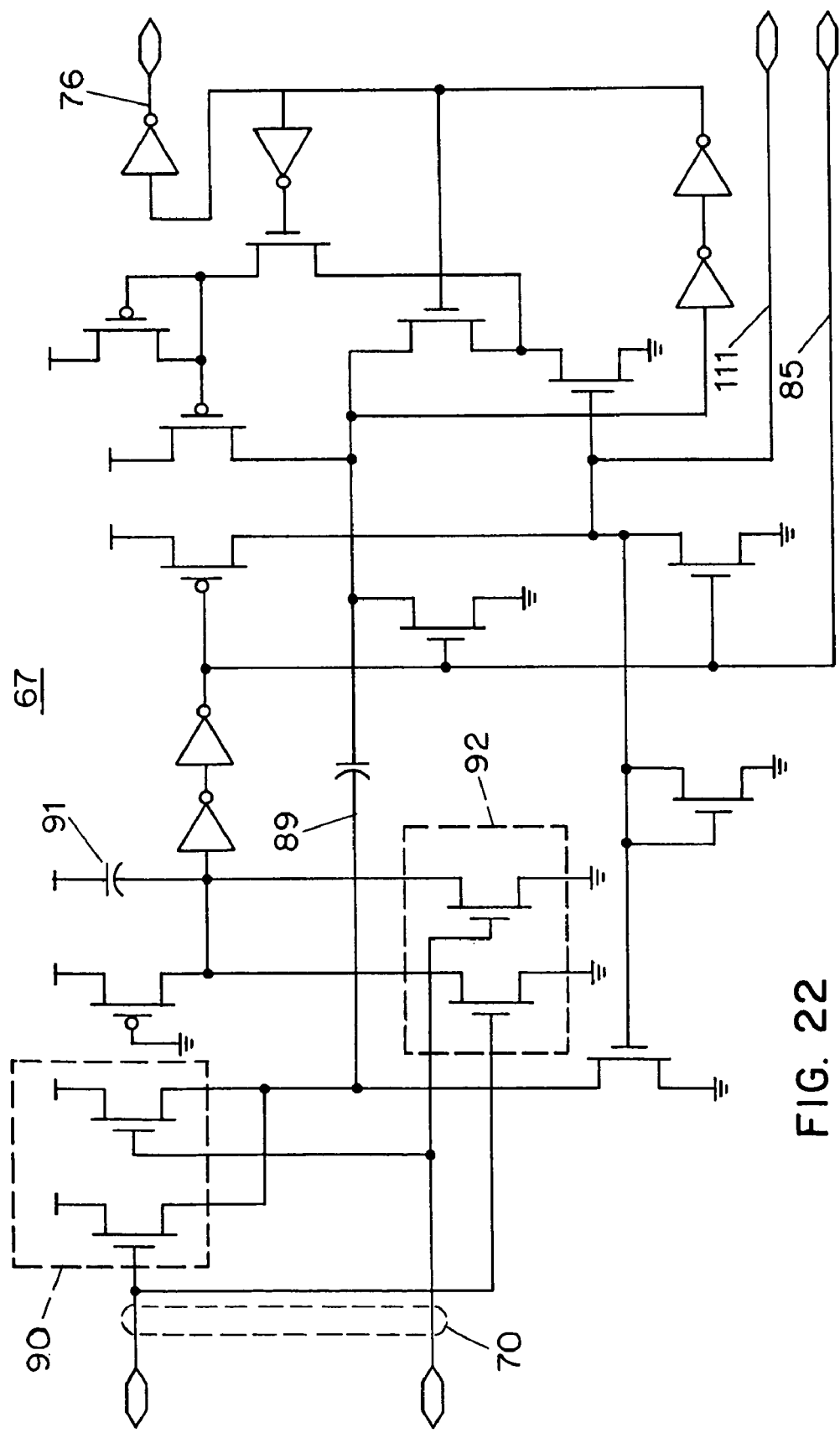
FIG. 22 show the analog portion 67, first introduced in FIG. 19, in greater detail.

Analog portion 67. FIG. 22 shows the analog portion 67, first introduced in FIG. 19, in greater detail.

Half-wave received power/clock. The two half-wave signals at lines 70 are summed through exemplary FETs 90 to line 89 which carries a full-wave signal developed from the two half-wave signals. The summed signal 89 is the sum of the two half-wave signals from lines 70. This summed signal 89 passes to circuitry between lines 89 and 76, which circuitry develops a clock at twice the frequency of the input at 89, and emits this doubled clock at line 76, which is a well shaped square wave.

Power-on-reset signal. When power-up happens, capacitor 91 starts to be charged. Eventually the previously mentioned power-on-reset signal 85 is generated and propagated to other parts of the chip 56, namely to receiver 88 and to logic portion 69 (FIG. 19).

Figure 25:
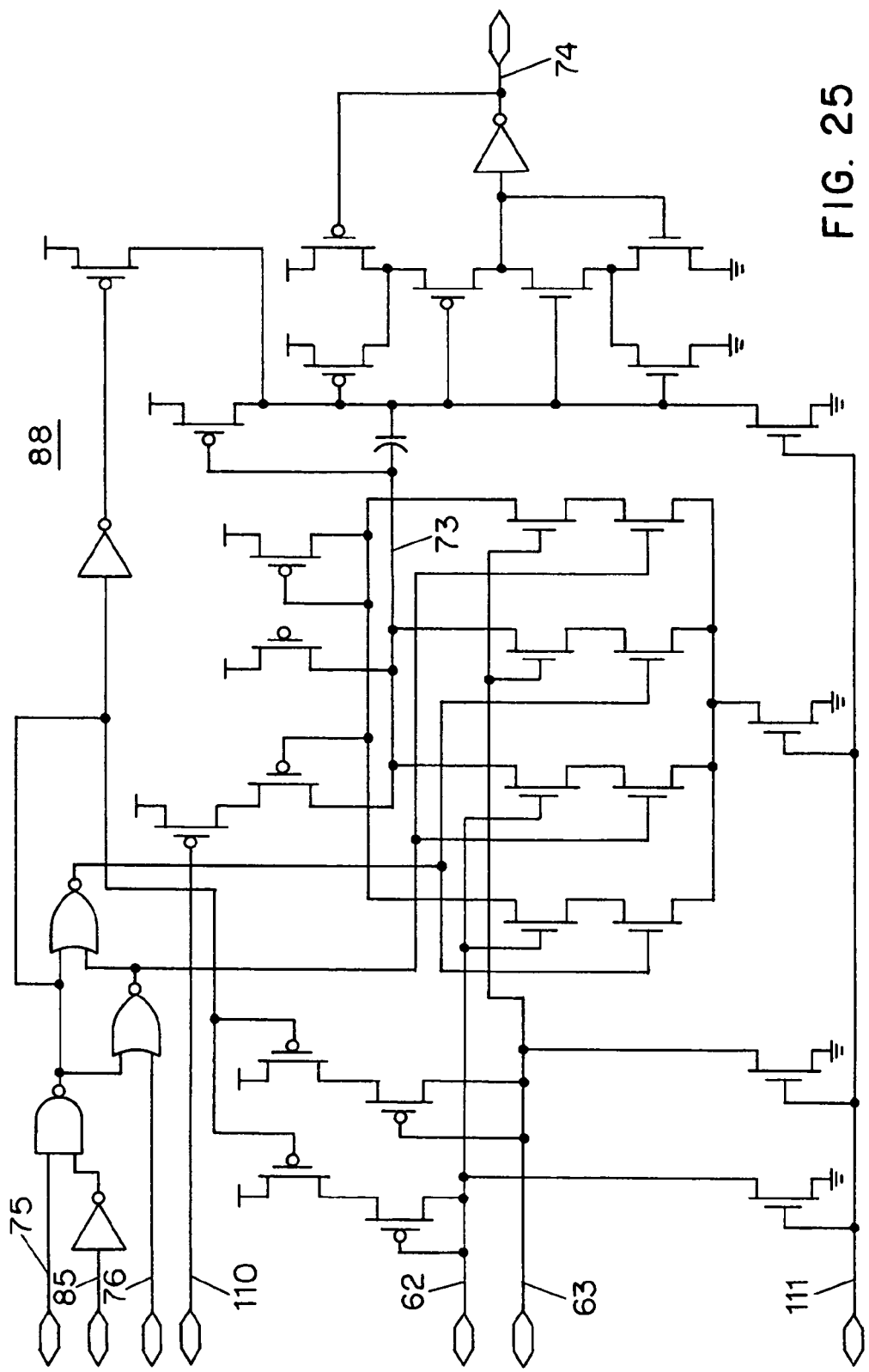
FIG. 25 shows receiver 88, introduced above in connection with FIG. 19, in greater detail.

Receive amplifier. FIG. 25 shows receiver 88, introduced above in connection with FIG. 19, in greater detail. PMAM (phase-modulation or amplitude modulation) line 110 determines whether the receiver 88 receives AM or PM signals. The received signal at 62, 63 is sampled with respect to the clock 76 which is defined by clock information in the power/clock signal 60, 61. The result is a serial received-data signal at line 74.

Figure 26:
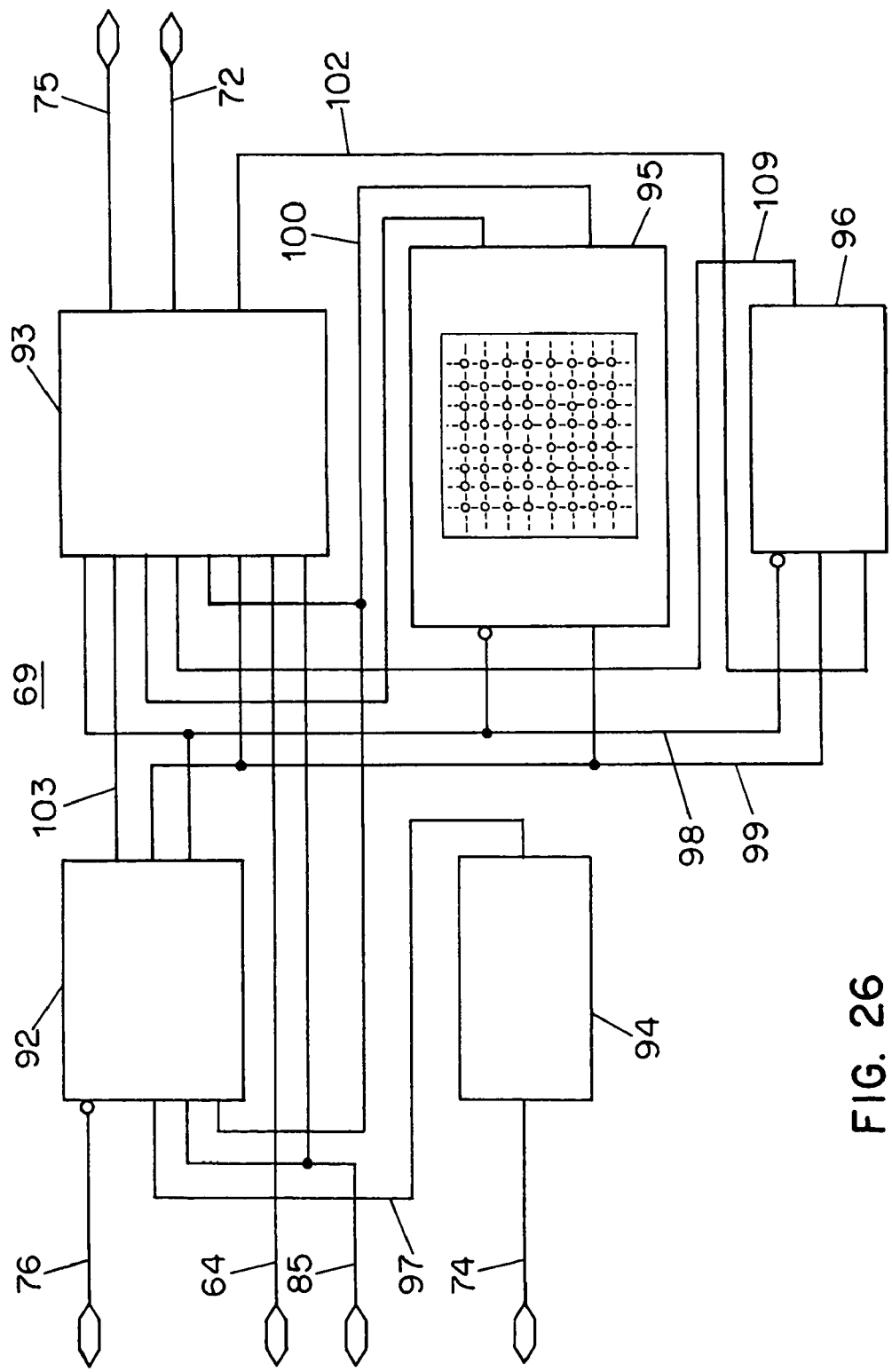
FIG. 26 shows logic portion 69, introduced above in connection with FIG. 19, in greater detail, including pipper 94, decoder 92, ID matrix 95, pseudo-random-number generator 96, and receive-data-compare circuit 93.

Logic portion 69. FIG. 26 shows logic portion 69, introduced above in connection with FIG. 19, in greater detail.

Figure 27:
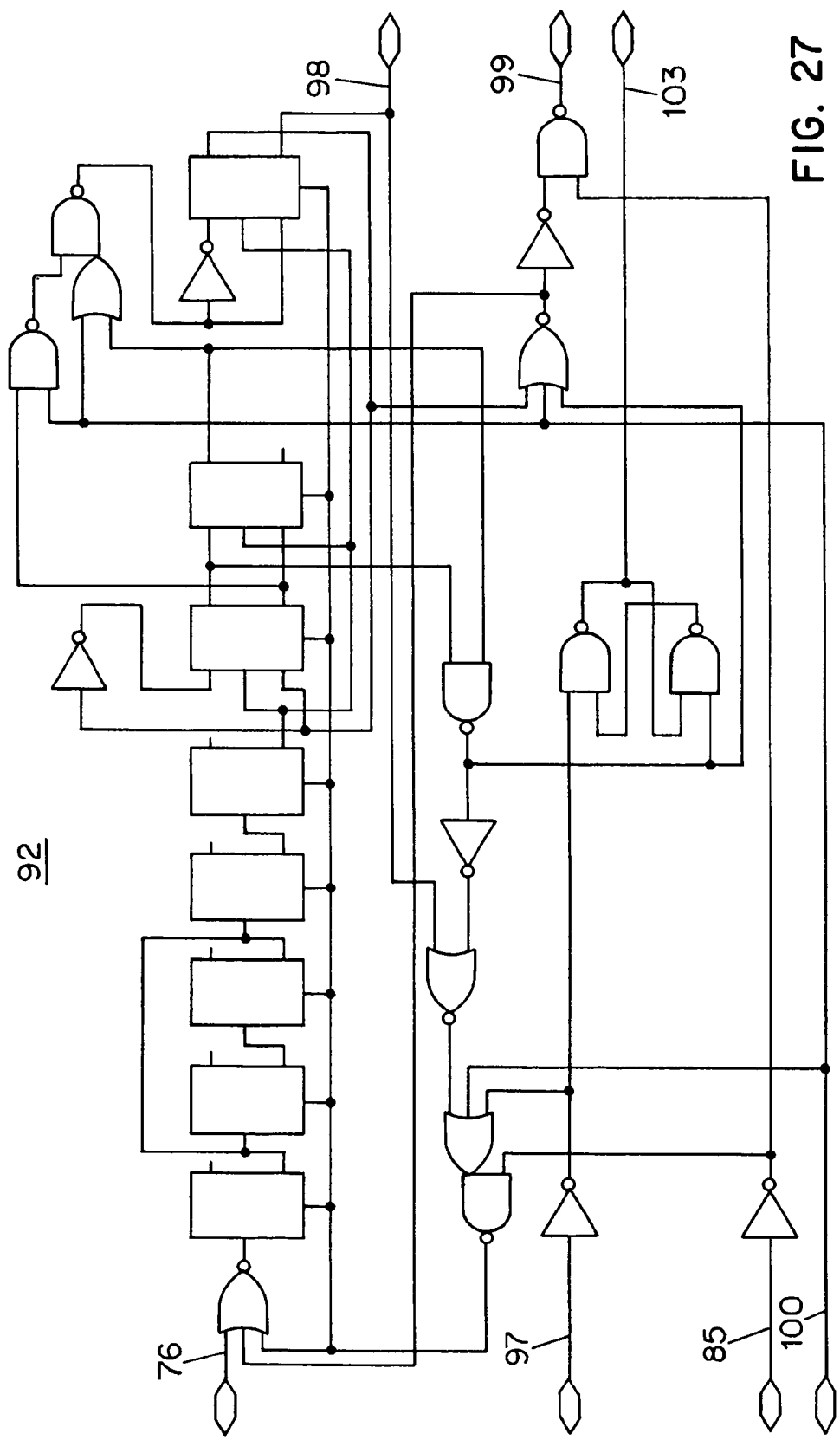
FIG. 27 shows decoder 92 in greater detail.
Figure 29:
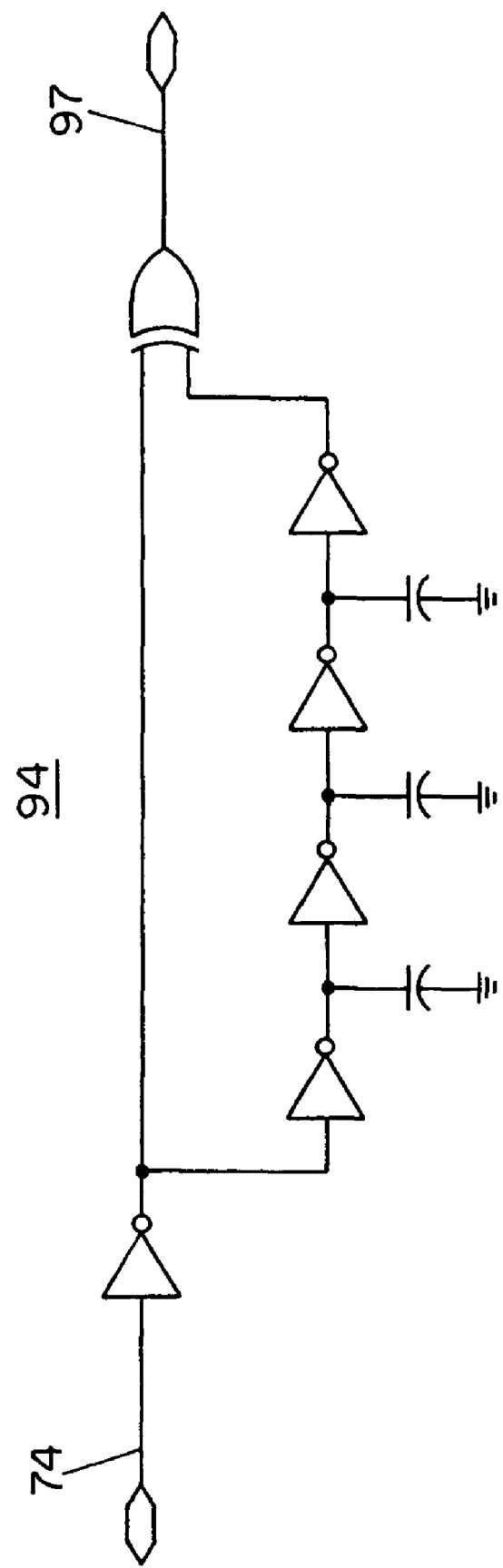
FIG. 29 shows pipper 94 in greater detail.

Receive path. Receive data on line 74 passes to pipper 94. Pipper 94 produces a pulse or "pip" on line 97 for each state change in the received data, and thus serves as a one-shot, as shown in FIG. 29. The pips pass on line 97 to decoder 92. FIG. 27 shows decoder 92 in greater detail. This circuit develops a synchronization pulse 99, which may be thought of as a serial start signal that is 1.5 bits wide (with bits defined by the clock at 76). The decoder 92 develops a bit clock 98 as well.

The EOR signal 109 represents the "end of receive". It is a signal that goes high at the end of an ID compare and will stay high until the end of a subsequent transmit. It is gated with the ID compare signals 106 and 107 in circuit 93 to produce the transmit enable signal 75, in FIG. 28.

Bit clock signal 98 is a clock at the data rate which is (in this exemplary embodiment) 1024 bits per second. This differs from the clock 76 which is 121072 Hertz, which is two times the power/clock frequency.

Figure 30:
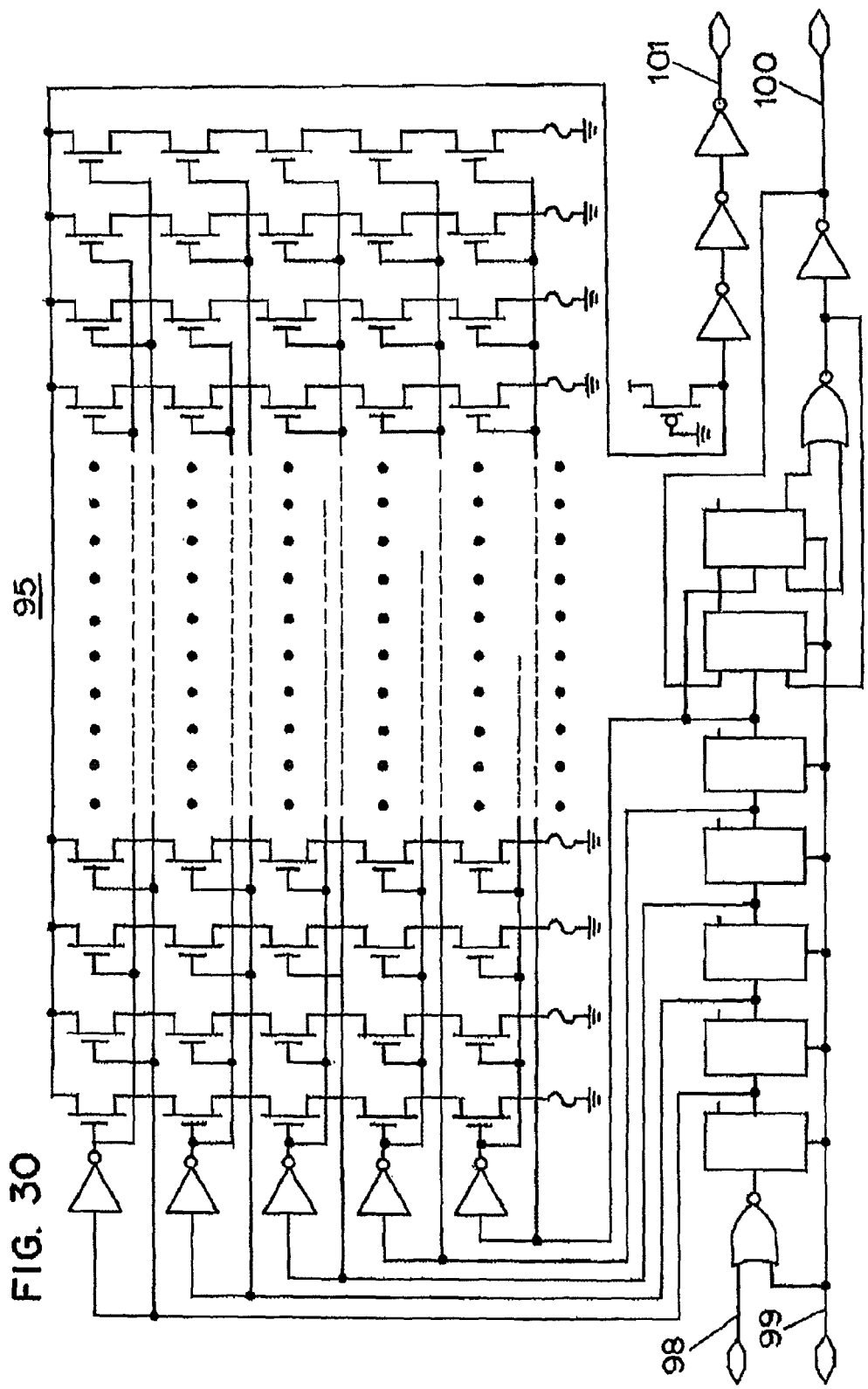
FIG. 30 shows ID matrix 95 in greater detail.

Returning to FIG. 26, an ID matrix 95 is shown. As detailed in FIG. 30, the ID matrix 95 receives the bit clock 98 and the synch signal 99 and counts up from 0 to 31. ID matrix 95 will have been previously laser-programmed at the factory with 32 bits of ID information which is intended to uniquely identify the particular chip 56. ID signal 101 is a serial signal communicating the 32 bits of ID. EOR (end-of-read) signal 100 is asserted when the count from 0 to 31 has finished.

It will be appreciated that in this exemplary embodiment the number of ID bits is 32. For particular applications it would be a straightforward matter to increase the size of the ID matrix 95 to 64 or 96 bits or some other number of bits.

Figure 31:
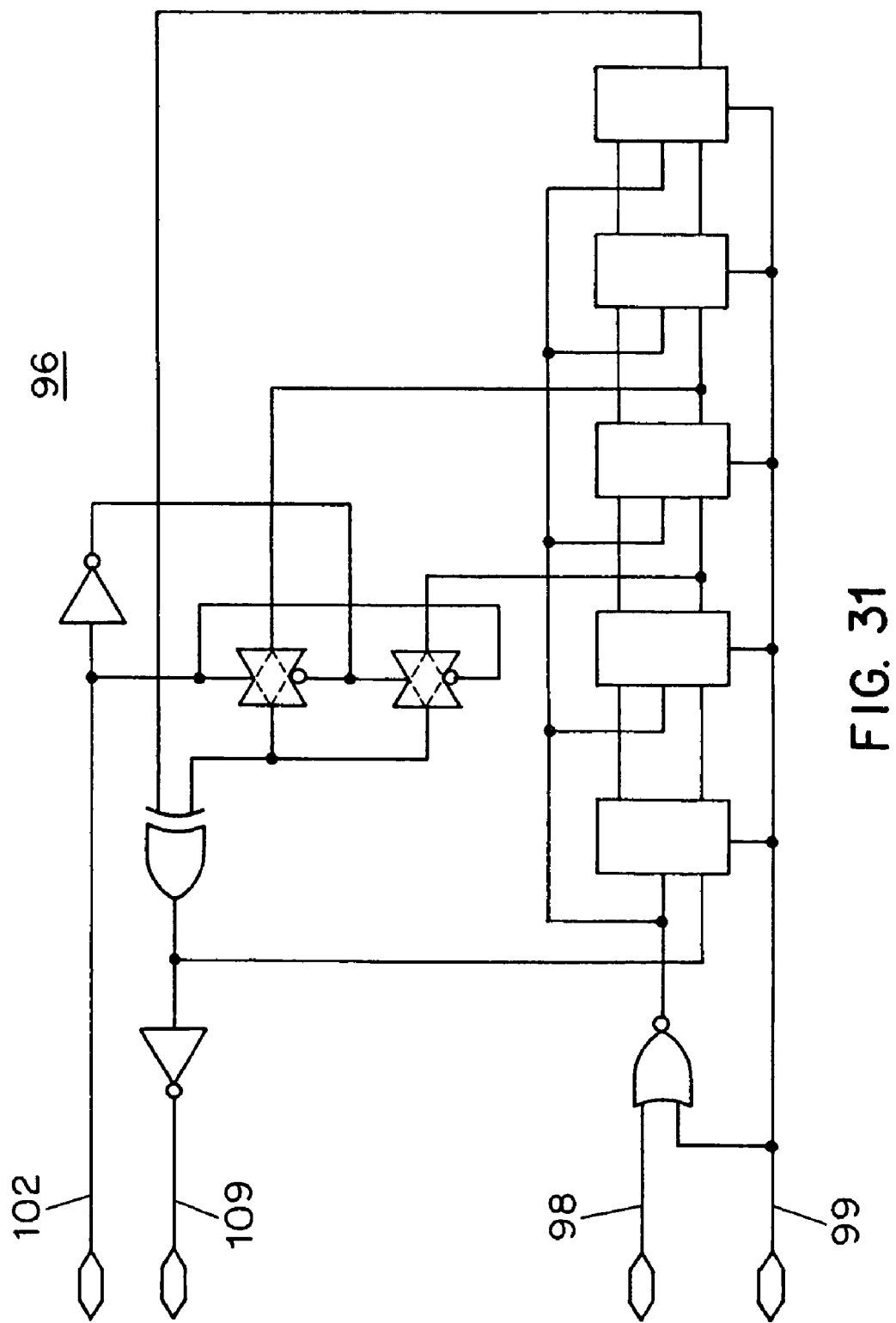
FIG. 31 shows pseudo-random-number generator 96 in greater detail.

Returning to FIG. 26, a pseudo-random-number generator 96 is shown. As detailed in FIG. 31, it takes as its input the bit clock 98 and the synch signal 99 and generates either of two different pseudo-random numbers, depending on whether select line 102 is asserted or not. The circuitry of FIG. 31 could just as well have been two thirty-two-bit memories, clocked through like the ID matrix of FIG. 30, each yielding one or another of two particular 32-bit numbers. But the handful of flip-flops and gates of generator 96 provide the same functionality without having to provide two more ID matrices similar to those of FIG. 30. Importantly, the behavior of the circuitry of generator 96 is deterministic, always yielding the same particular 32-bit number each time it is triggered. In the particular case of the generator of FIG. 31, one of the generated numbers is 0011 0100 1000 0101 0111 0110 0011 1110 (binary) or 3485763E (hexadecimal) and the other number is 0001 1011 1010 1000 0100 1011 0011 1110 (binary) or 1BA84B3E (hexadecimal).

What remains to be discussed in FIG. 26 is receive-data-compare circuit 93. As may be seen from FIG. 26, it receives several inputs:

EAS (electronic article surveillance) signal 64 from fusible link 65 power-on-reset signal 85 from analog circuitry 67 synch signal 99 from receive-decode circuitry 92 bit clock signal 98, from receive-decode circuitry 92, in turn from analog circuitry 67, in turn from rectifier 66, in turn from power antenna 54 received-data signal 103 from receive-decode circuitry 92, in turn from pipper 94, in turn from analog circuitry 67, in turn from circuitry 68, in turn from signal antenna 55

ID signal 101 from ID matrix 95 pseudo-random-number sequence signal 103 from generator 96 end-of-read signal 100 from ID matrix 95

Figure 28:
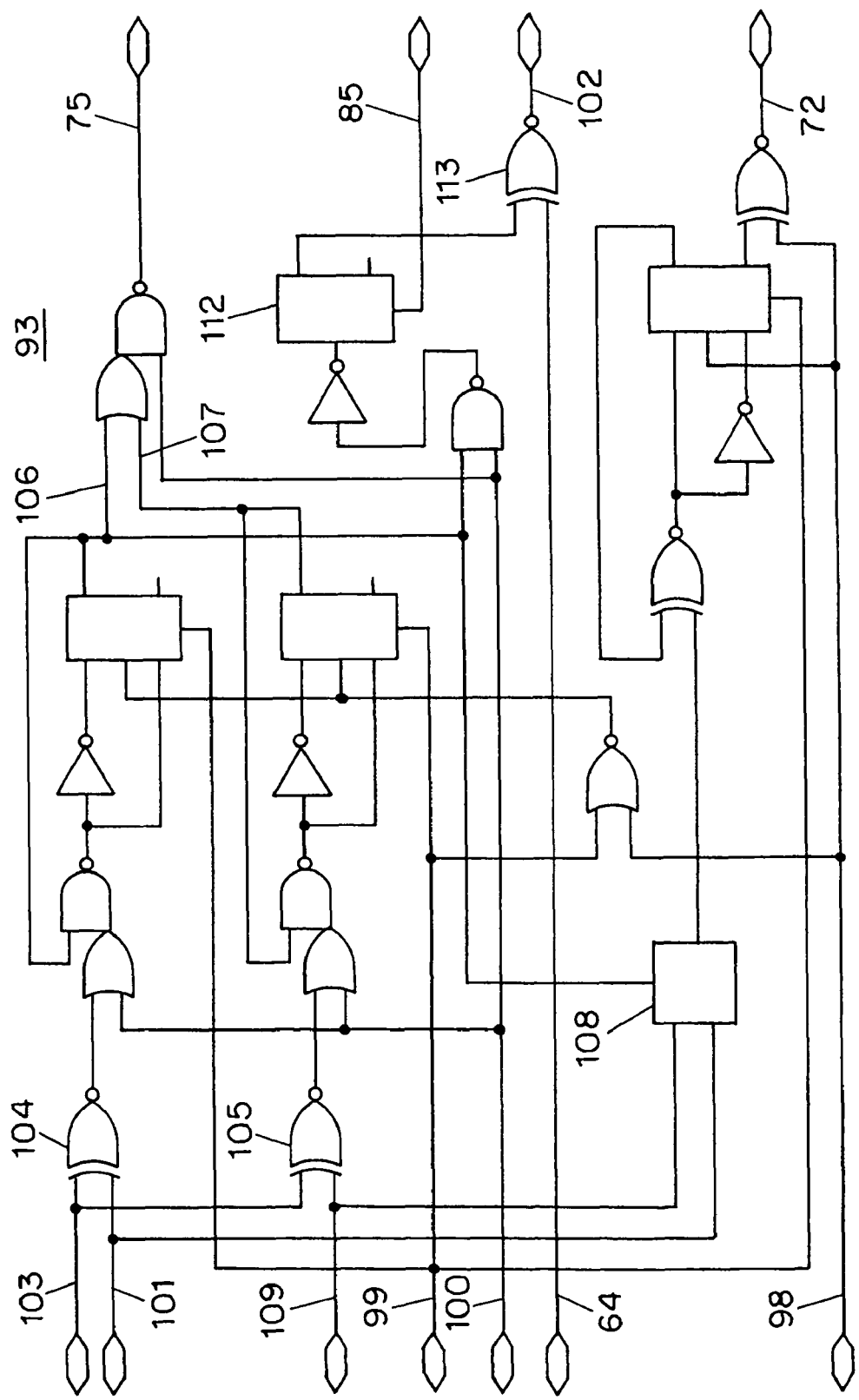
FIG. 28 shows receive-data-compare circuit 93 in greater detail.

The function of the circuit 93 is detailed in FIG. 28.

EAS signal 64 determines whether select line 102 is asserted or not, thus selecting one or the other of the above-mentioned two pseudo-random sequences.

At gate 104, the received data at 103 are compared with the chip ID signal at 101. In the event the received data match the ID, then the equal-ID signal 106 is developed.

At gate 105, the received data at 103 are compared with the pseudo-random signal at 103. In the event the received data match the pseudo-random signal at 103, then the equal-pseudo-random-signal signal 107 is developed.

If either of "equal" signals 106 or 107 is asserted, then the transmit enable signal 75 is asserted at the end of a sequence read (defined by line 100).

Selector 108 determined whether the transmitted data will be the pseudo-random-number signal 103 or the chip ID signal 101. If the ID matched, then what is transmitted is the pseudo-random-number from 109. If the ID did not match but the pseudo-random number matched, then what is transmitted is the chip ID. This is described in more detail below in connection with FIGS. 23 and 24.

Flip-flop 112 maintains an internal state in the chip 56 indicative of whether the chip 56 has (since the most recent power-on-reset) been addressed by its own ID. The input to this flip-flop 112 is the "equals ID" signal 106 and it gets cleared by the power-on-reset signal 85. The output (which is indicative of whether the chip 56 has been addressed by its own ID) is XORed at 113 with the EAS signal 64 to develop the selection line 102 which causes the pseudo-random-number generator 96 to generate one or the other of its two pseudo-random numbers. This is described in more detail below in connection with FIGS. 23 and 24.

Figure 23:
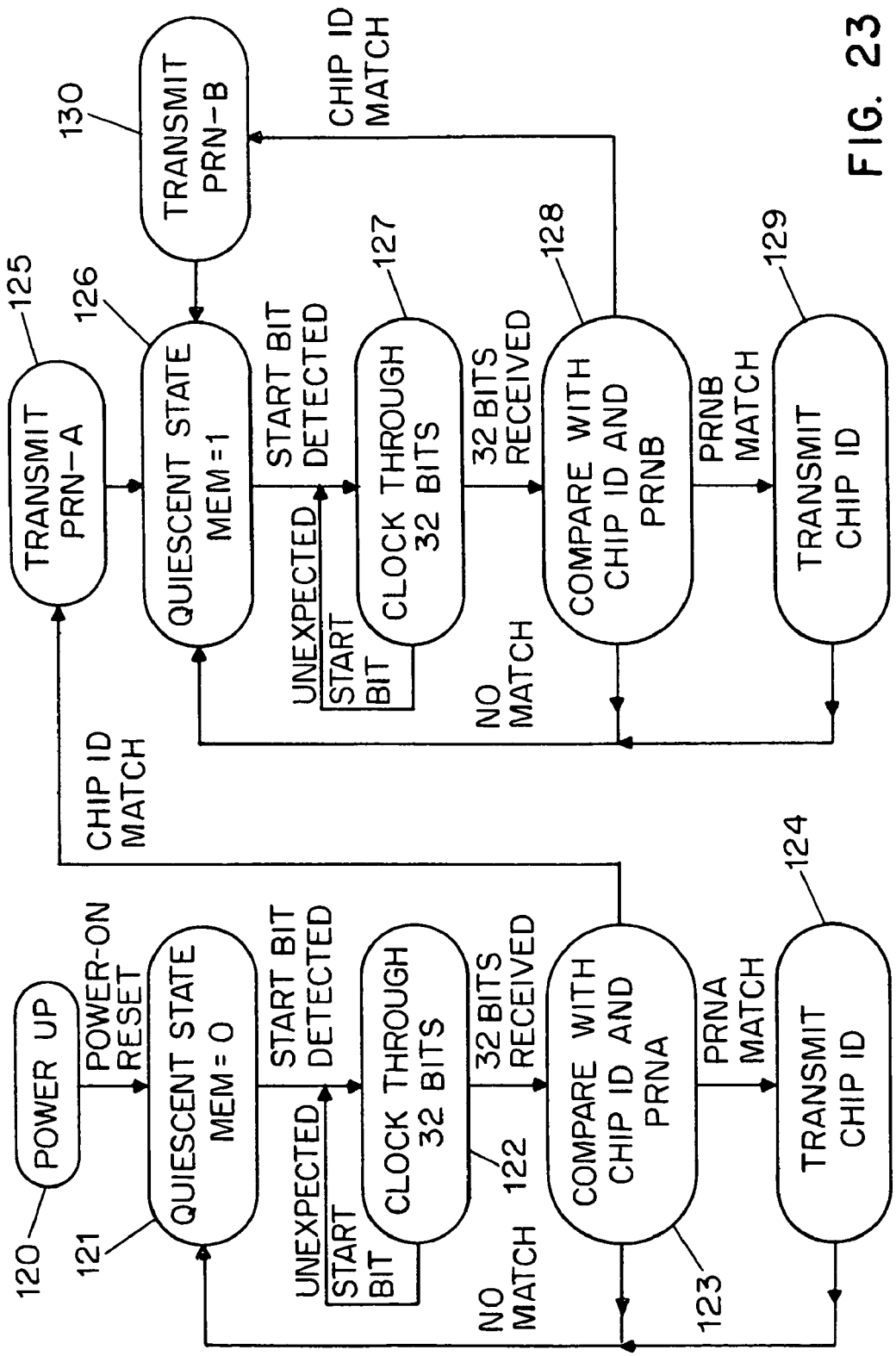
FIGS. 23 and 24 describe the externally observable behavior of the system of chip 56. The behavior differs depending on whether the EAS link has been blown, that is, whether the EAS line 64 is high or low.
Figure 24:
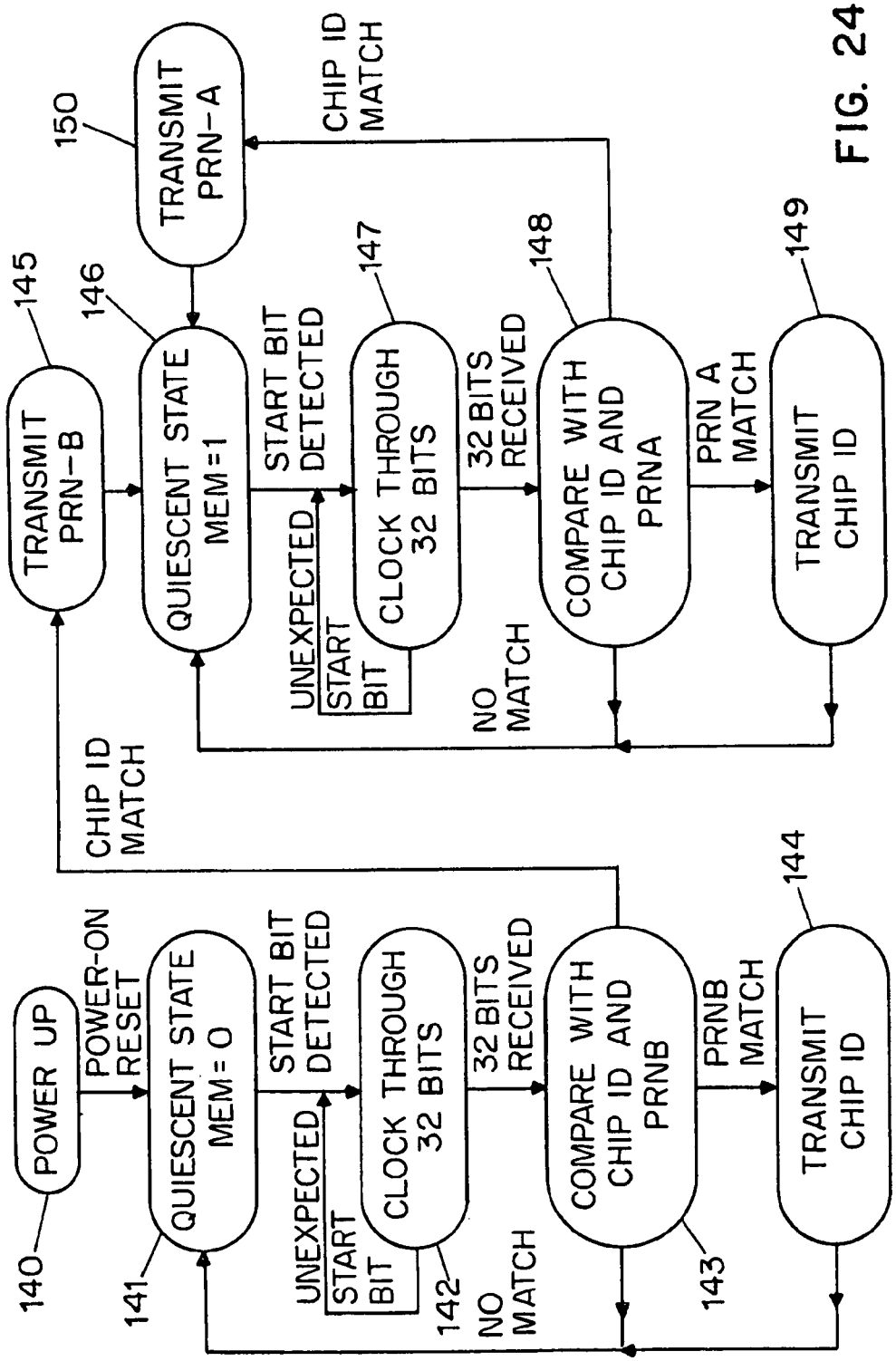

FIGS. 23 and 24 describe the externally observable behavior of the system of chip 56. The behavior differs depending on whether the EAS link has been blown, that is, whether the EAS line 64 is high or low.

FIG. 23 describes the behavior of the chip 56 in the event the EAS link has not been blown.

The chip powers up at 120 (prompted by being bathed in RF energy at the coil lines 60, 61) and performs a power-on reset (line 85, FIG. 19).

The chip is in a quiescent state at 121 with a state variable "mem" equal to zero. (This means that flip-flop 112 in FIG. 28 is not set.)

Eventually it may happen that a received RF signal at lines 62, 63 (FIG. 19) contains a "start bit" detected by decoder 92 (FIG. 27). If so, then the succeeding 32 bits of received serial data are compared with the chip ID and with the pseudo-random number "A" ("PRNA"). (Another possibility is that another "start bit" is detected prior to the receipt of the last of the 32 bits of serial data, in which case this "unexpected start bit" aborts the count of 32 bits which starts over at state 122.) If the match is a match to the chip ID then the state passes to box 125. If the match is not a match to the chip ID then if the match is a match to PRNA, the state passes to box 124 where the chip transmits its own ID and then the state passes to 121. If neither match succeeds, then the state passes to 121.

It was previously mentioned that one possible event in state 123 could be that the match is a match to the chip ID, in which case then the state passes to box 125. The PRNA is transmitted and the state passes to box 126.

Later it may happen that a received RF signal at lines 62, 63 (FIG. 19) yet again contains a "start bit" detected by decoder 92 (FIG. 27) at a time when the chip 56 is in the state of box 126. The state of box 126 is that the chip 56 has at least once (since the most recent power-on-reset at 120, 121) been addressed by its own chip ID (that is, the match of 123, 125). In this event, then the succeeding 32 bits of received serial data (clocked in at 127) are compared with the chip ID and with the pseudo-random number "B" ("PRNB"). (Another possibility is that another "start bit" is detected prior to the receipt of the last of the 32 bits of serial data, in which case this "unexpected start bit" aborts the count of 32 bits which starts over at state 127.) If the match is a match to the chip ID then the state passes to box 130 where PRNB is transmitted. If the match is not a match to the chip ID then if the match is a match to PRNB, the state passes to box 129 where the chip transmits its own ID and then the state passes to 126. If neither match succeeds, then the state passes to 126.

It will be appreciated that in this exemplary embodiment, the circuitry of chip 56 does not receive and store 32 bits of received serial data, followed by a 32-bit comparison with the chip ID and with the PRNA or PRNB. To do this would require storage of multiple internal states so as to store the 32-bit number and to subsequently perform a comparison. Storage of those states would take up chip real estate. Such a subsequent comparison would take time and would delay any response by the chip 56 by the amount of time required to perform the subsequent comparison.

Instead, the circuitry simply performs the comparison in real time, as the serial data stream is being received. The incoming serial data (RXD line 103, FIG. 28) is simultaneously being compared with a serial data stream indicative of the chip's unique ID (line 101, FIG. 28) and with a serial data stream indicative of the PRNA or PRNB (line 109, FIG.

28). By the end of the comparison process, the signal 106 indicative of a match of the chip ID may be high, or the signal 107 indicative of a match of the PRNA or PRNB may be high. Thus the box 123 or 128 does not (in this exemplary embodiment) represent a comparison step that is subsequent to the receipt of 32 bits of data at 122 or 127. Instead, the box 123 or 128 represents action taken as a result of the comparison that took place during the clocking-in of the 32 bits of data.

It will be appreciated from FIG. 23 that the states in the left-hand portion of the figure (states 121 through 124) represent states in which the chip has not yet been addressed (since the most recent power-on-clear) by its own chip ID, and the states in the right-hand portion of the figure (states 125 through 129) represent states in which the chip has been addressed at least once (since the most recent power-on-clear) by its own chip ID. Thus any time in states 121 through 124 when the generator 96 (FIG. 31) is triggered to generate its number, it generates number PRNA. In contrast, any time in states 125 through 129 when the generator 96 is triggered to generate its number, it generates number PRNB.

FIG. 24 describes the behavior of the chip 56 in the event the EAS link has been blown. The events and state changes depicted in FIG. 23 are nearly identically depicted in FIG. 24, except that each time PRNA appears in FIG. 23, PRNB appears in FIG. 24, and vice versa. This is because gate 113 (FIG. 28) is an exclusive gate, XORing the EAS signal 64 with another signal before developing the number-selection signal 102. (The signal with which it is XORed, as discussed above in connection with FIG. 28, is the output of flip-flop 112 which is indicative of whether the particular chip 56 has ever been successfully addressed by its own chip ID.)

It will thus be appreciated that chip 56 provides the ability to respond to external stimuli in a way that differs depending on the external stimuli, a minimal number of gates and requiring storage of only a minimal number of internal states. The chip 56 is able to develop its own power from an RF field in which it is bathed, a field that provides a clock signal for all of the internal processes of chip 56. In this way there is no need for a crystal oscillator or resonator or other internal clock reference within the chip 56, thus reducing component count and power requirements. The chip 56 is able to detect the designer's choice of AM- or PM-modulated data from a signal RF field that is not the same as the power-clock RF field. The chip 56 is able to transmit, in an active way, the designer's choice of AM- or PM-modulated data at the signal RF frequency, drawing for its modulation upon the power-clock RF field that continues to bathe the chip 56.

The state diagrams of FIGS. 23 and 24 thus illustrate the power and versatility of a very simple protocol or instruction set. With this extremely simple instruction set or protocol, the system designer can accomplish a great deal.

It is instructive to consider whether there is value in providing parity or checksum information (e.g. CRC) in messages in either of the two directions (base to tag, or tag to base). A chief drawback is that this uses up RF bandwidth, fitting a smaller number of messages into (say) an hour of time. It will be appreciated that any failed message (e.g. a one that changes to a zero or vice versa) will inevitably be found out at some point during the communications. If, for example, a chip ID received by the base station has been corrupted (unknown to the base station) then a message later addressed to that chip by its ID will fail. If, for example, a chip ID received at a tag has been corrupted (unknown to the tag) then the tag will simply not respond but will later be found in some later discovery process.

Consider, for example, the simple case where a host system wishes to exchange a message with a tag. To send the message, the base station (host system) starts sending out its power-clock signal. In an exemplary embodiment this is at 65536 Hertz. Then, after having allowed enough time for a power-on-reset within the tag, the base station sends the message at (for example) 131072 Hertz. The message may be any one of three possible messages:
message containing an ID
message containing pseudo-random number A
message containing pseudo-random number B The content of the message is the start bit and 32 bits of ID or 32 bits of PRN.

The response, if any, received by the base station is a function in part of whether there are or are not any tags within the relevant geographic area, namely any tags that are being bathed by the power/clock RF field (at 65536 Hz) and that are able to pick up the signal RF field (at the frequency that is double the 65536-Hz field). (As discussed above, the relevant geographic area may be some tens or hundreds of square feet, as compared with reading distances with some RFID technologies that are only in the nature of a few inches or a few centimeters.)

The response is further a function of the internal states of the tags as well as a function of the respective chip IDs of the tags. (It is assumed for this discussion that no two tags have chips with the same chip IDs.)

Suppose the message transmitted by the base station is a chip ID. Then there may be no response at all (for example if no tag with a chip with that ID is within the geographic area). Another possibility is that the tag with the chip with that ID is within the geographic area. In that case, the tag responds with PRNB if the tag's EAS link is not blown, or responds with PRNA if the tag's EAS link is blown. The base station is able, in this way, to: a) confirm the presence of the tag with that ID within the geographic area; and b) determine whether the EAS link is blown or not, for that tag.

Suppose, on the other hand, that the message transmitted by the base station is PRNA. Then there may be no response at all (for example if no tag with an intact EAS link is within the geographic area). Another possibility is that one or more tags with intact EAS links are within the geographic area. In that case, then each of the tags responds with its chip ID.

Of course if the number of such tags is two or more, then the chip IDs will have been transmitted simultaneously. (Each chip will have transmitted at exactly the same time because all of the chips draw upon exactly the same clock reference from the power-clock RF signal). In the most general case the base station will not be able to pick out any one of the chip-ID signals so as to distinguish it from the other chip-ID signals. A variety of techniques may be employed to disambiguate the signals. The base station may employ varying RF signal levels, transmitting more power-clock energy and less signal energy to reach, eventually, one tag to the exclusion of others. It may instead simply cut back on both the power-clock level and the signal level, again reaching one tag to the exclusion of the others. The base station may be equipped with more than one antenna and may transmit power on one and signal on another, in an attempt to reach one tag only. The base station may be equipped with two or more antennas and may transmit power on one and cycle through transmitting signal on the others, in an attempt to reach one tag only. The base station may be equipped with two or more antennas and may transmit signal on one and cycle through transmitting power on the others, in an attempt to reach one tag only.

It will also be appreciated that the fields being transmitted and received may fall off at $1/d^3$ or even faster. As such, if two tags which are both responding to a poll are at different distances from the base station antenna, it may well happen that one of the two tags will have a response that is twice as loud as the other, or more than twice as loud, and will be resolved to the exclusion of the other, even if there is no use of diversity antennas or varied transmit power or any of the other approaches just discussed.

The base station may skew slightly the phase of the power/clock field relative to the signal message in an attempt to reach one tag only or at least fewer than all of the tags. In the exemplary case of the chip 56, resolution of two or more responding tags is favored by the detector circuit used in the tag. There is a term in the output signal level related to the cosine of the relative phase between the signal and power frequencies. Not all tags will have the same term as it will be related to tuning and orientation. So the tag reader can adjust this in the transmission (intentionally skewing the phase between the signal and power fields) and so preferentially talk to selected tags. The function is more acute in the AM modulation mode, as the polarity of the signal become important too. With AM, only approximately one-third of the tags will receive on a particular fixed phase setting. This yields fewer conflicts and faster tag discovery.

Eventually, if all goes well, the base station will have reached a single tag, and will have picked up the ID of that tag. In that case, base station may choose to transmit that tag ID. The tag will respond with PRNB, and in this way, the base station may conclude that it has successfully reached that particular tag.

Importantly, that tag which has been successfully reached (addressed) will now no longer respond to PRNA. It is now in state 126 in FIG. 23, meaning that flip-flop 112 (FIG. 28) is set.

The base station may now repeat the process of attempting to reach only one tag while transmitting PRNA, eventually reaching one tag and transmitting that tag ID and causing that tag as well to stop responding to PRNA. Eventually the base station will have identified all of the tags having an EAS link that is not blown, and will have transmitted each such tag ID so that no more of the tags will respond to PRNA. In this way the base station will have discovered all of the tags having an intact EAS link.

In a similar way, the base station may use the protocol of FIG. 24 to discover all of the tags having blown EAS links.

Of course if a discovery (for example) of all tags with intact EAS links has been completed, it might later be desired to do the discovery all over again, so as to learn whether any tags with intact EAS links have departed from the geographic area or have entered the geographic area (or have had their EAS links blown since the last discovery). To make this possible, the base station simply turns off the power/clock RF field, and later turns it back on again. This causes all of the tags to undergo a power-on-reset.

Figure 32:
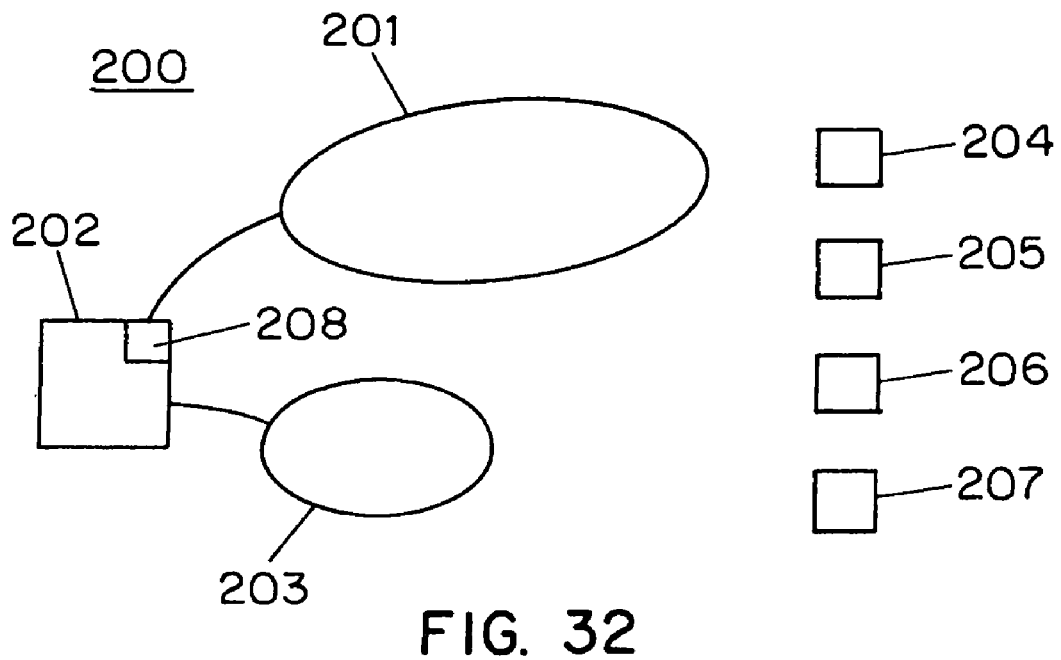
FIG. 32 shows the simple system configuration of a base station 202 communicating with a plurality of tags 204-207.

FIG. 32 shows the simple system configuration of a base station 202 communicating with a plurality of tags 204-207. (This is analogous to the portrayal of FIG. 9) In this system 200, a clock reference 208 defines the clock being transmitted on power/clock antenna 201, which is of course coupled with antennas 54 (FIG. 18). From time to time, signal messages are transmitted on signal antenna 203, which is of course coupled with antennas 55 (FIG. 18). Alternatively, a single antenna 52 (FIG. 18) may serve both purposes with respect to host 51, as was described above in connection with FIG. 18.

Figure 33:
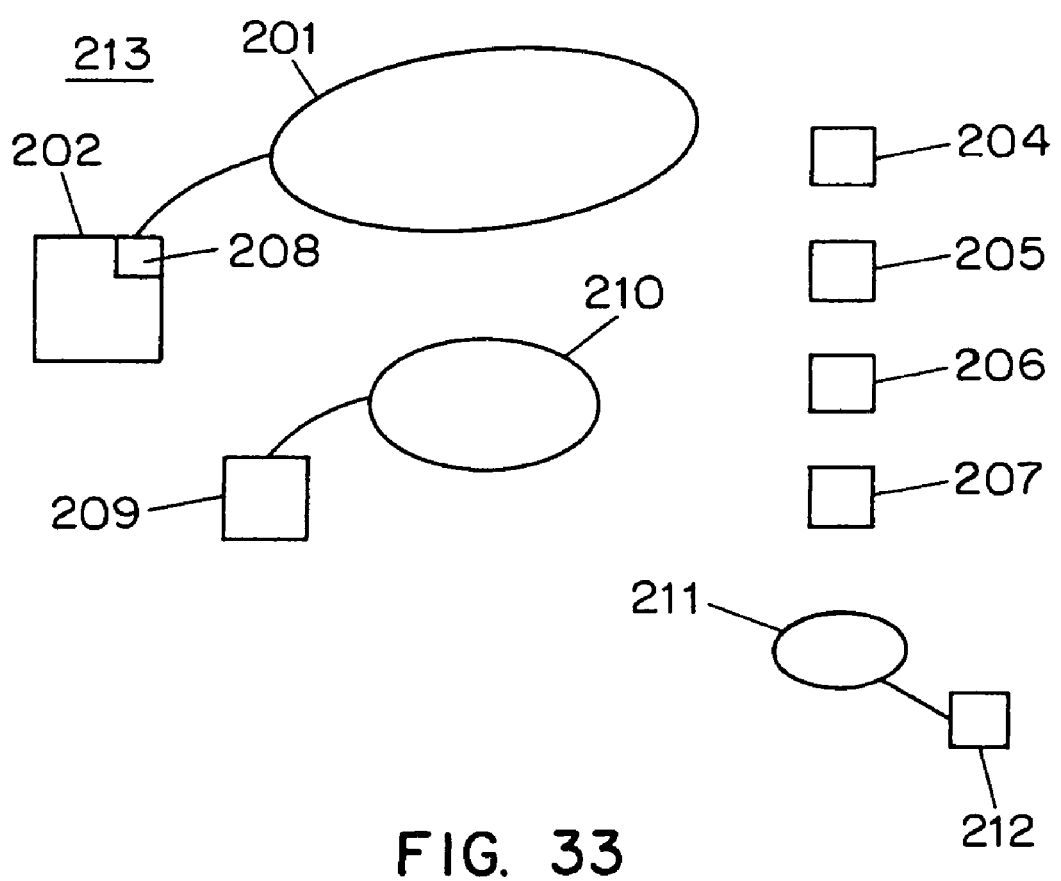
FIG. 33 shows a base station 202 having a clock reference 208, which base station 202 transmits power/clock RF energy via antenna 201, bathing a geographic area in RF energy providing power and clock.

It will be appreciated, however, that nothing requires that the signal-exchanging device be the same as the power/clock-transmitting device. Thus, FIG. 33 shows a base station 202 having a clock reference 208, which base station 202 transmits power/clock RF energy via antenna 201, bathing a geographic area in RF energy providing power and clock. Tags 204 through 207 may be within that area. Additionally, however, there may be two or more signal-exchanging devices 209 and 212 within the area, each with a respective antenna 210, 211. A communications channel (omitted for clarity in FIG. 33) may permit the host to exchange more complicated messages with the devices 209, 212, causing each of the devices 209, 212 from time to time to conduct tag discovery or to address particular tags by ID. In this way, a peer-to-peer exchange may take place between a device (e.g. 209) and a tag (e.g. 205), with other communications taking place between the host and the device before and/or after the peer-to-peer exchange. (This is analogous to the portrayal of FIGS. 10 and 11.) It will thus be appreciated that the system 213 will permit localization of a tag as being close to a particular device 209, 212, thereby pinning down with some particularly the location of a particular tag. It will also be appreciated that disambiguation of multiple simultaneous responses (e.g. in response to a PRNA or PRNA query) will be facilitated since one device (e.g. 209) may reach a tag at a time when some other device (e.g. 212) is not able to reach that same tag.

It is contemplated that the devices 209, 212 are much more sophisticated than the chips 56 of the tags 204 through 207. The devices 209, 212 may have battery power, while the tags 204 through 207 do not. Interestingly the batteries in the devices 209, 212 may last a long time (as long as the battery shelf life, or longer) because: (1) some of the power to operate the system 213 is being transmitted from the base station 202 via antenna 201, thus relieving the devices 209, 212 from the need to supply such power to the tags 204-207; (2) each device 209, 212 will not need to expend battery power to maintain its internal clock, because the base station 202 is providing a clock via antenna 201; and (3) each device 209, 212 will not need to expend battery power to transmit, any more than the tags 204-207 would, since they can all be receiving power (during transmit times) from the base station 202 via antenna 201.

It is possible, then, to envision a system in which there are multiple devices 209, 212, together with myriad tags 204-207, and in which the devices 209, 212 each have an LED or piezoelectric speaker, to facilitate finding the exact location of a particular tag. The system 213 could make note of the particular device 209, 212 which successfully reached the particular tag, and if there was more than one, then the one that reached that tag with minimal RF power levels. That device 209, 212 could then flash its LED or sound its speaker, thereby letting a human user find the particular tag due to its proximity to the device 209, 212.

In an anti-theft application, there could be a device 209, 212 nearby to an exit of a retail store, periodically transmitting PRNA from an antenna 210, 211 nearby to that exit. A response might be indicative of a tag that is affixed to something that is being stolen by way of that exit.

A sequence of steps for system 213 (FIG. 33) could be as follows.

The base station 202 starts sending out its power-clock signal via antenna 201, and it draws upon clock reference 208.

Thereafter, a device 209 sends a message by means of its antenna 210. The message may be any one of three possible messages:

message containing an ID
message containing pseudo-random number A
message containing pseudo-random number B The content of the message is the start bit and 32 bits of ID or 32 bits of PRN.

A response may then be received by the device 209, again by means of its antenna 210. Again, there may optionally be more than one antenna available to device 209 for use in disambiguating multiple tag responses. The device 209 may thus be at some distance from base station 202 and its antenna 210 may have a smaller reach than the antenna 201.

Another embodiment of the invention uses a high-gain amplifier circuit independent of the power supplied to the circuit. Since power to the invention may be from an independent source, it is possible to include a high-gain sensitive amplifier circuit to detect signals from a few mV to many volts.

Another embodiment of the invention uses a power carrier that is a harmonic of a watch crystal. Thus, it is possible to have active radiating tags that also use a low-cost watch crystal as a reference, and both active and passive tags may freely communicate with each other.

Those skilled in the art will have no difficulty devising myriad obvious improvements and variations of the invention, all of which are intended to be encompassed within the claims which follow.

We claim:

1. A system for detection and tracking of entities, said system comprising:
   a) a low frequency radio tag, carried by each of the entities, said tag comprising:
      (i) a tag communication antenna, operable at a first radio frequency not exceeding one megahertz;
      (ii) a transceiver, operatively connected to said tag communication antenna, said transceiver being operable to transmit and receive data signals at said first radio frequency;
      (iii) a data storage device, operable to store data comprising identification data for identifying said low frequency radio tag;
      (iv) a programmed data processor, operable to process data received from said transceiver and said data storage device, and to send data to cause said transceiver to emit an identification signal based upon said identification data stored in said data storage device; and
      (v) an energy source for activating said transceiver and said data processor, said energy source comprising a tag energization antenna operable to receive radio frequency energy from an ambient radio frequency field of a second radio frequency;
   b) at least one field communication antenna disposed within a distance from each entity that permits effective communication therewith at said first radio frequency;
   c) a reader, in operative communication with said field communication antenna, said reader being operable to receive data signals from said low frequency radio tags;
   d) a transmitter in operative communication with said field antenna, said transmitter being operable to send data signals to said low frequency radio tags;
   e) a central data processor in operative communication with said reader and transmitter; and
   f) a field energization antenna operable to produce said ambient radio frequency at the tag energization antenna of said tag.

2. The system as set forth in claim 1, said first radio frequency being an integral multiple of said second radio frequency.

3. The system as set forth in claim 1 said first radio frequency being 128 hertz and said second radio frequency being 32 hertz.

4. The system as set forth in claim 1, said tag communication antenna comprising a first plurality of turns of wire, and said tag energization antenna comprising a second plurality of turns of wire.

5. The system as set forth in claim 4, said tag communication antenna and said tag energization antenna each having a substantially flat configuration.

6. The system as set forth in claim 2, said low frequency radio tag comprising a frequency multiplier operable to integrally multiply the second radio frequency and to generate a clock signal at said first radio frequency and to supply said clock signal to said transceiver.

7. The system as set forth in claim 2, said field communication antenna comprising a large communication loop surrounding said objects, said field energization antenna comprising a large energization loop surrounding said objects.

8. The system as set forth in claim 7 wherein said objects and said field communication antenna are disposed in a repository selected from the group consisting of: a truck, a warehouse, storage shelving, a livestock field, a freight container, and a sea vessel.

9. The system as set forth in claim 1, said field communication antenna, said field energization antenna, said reader, and said transmitter being combined into a unitary handheld device.

10. The system as set forth in claim 1, wherein said identification data comprises an internet protocol (IP) address, and wherein said central data processor is operable for communication with an internet router.

11. The system as set forth in claim 1, said low frequency radio tag further comprising a sensor operable to generate a status signal upon sensing a condition experienced by an entity that carries said low frequency radio tag, said transceiver being operable to automatically transmit a warning signal at said first radio frequency upon generation of said status signal.

12. The system as set forth in claim 11, said condition being selected from the group consisting of: temperature change, shock, change in GPS position, and dampness.

13. The system as set forth in claim 1, said low frequency radio tag further comprising at least one indicator device which is automatically operable upon receipt by said transceiver of a data signal that corresponds to said identification data stored at said data storage device.

14. The system as set forth in claim 1, said low frequency radio tag further comprising
   (i) a sensor operable to generate a status signal upon sensing a condition experienced by an entity that carries said low frequency radio tag; and
   (ii) at least one indicator device which is automatically operable upon generation of said status signal.

15. The system as set forth in claim 14, said condition being selected from the group consisting of: temperature change, shock, change in GPS position, and dampness.

16. The system as set forth in claim 1, said low frequency radio tag further comprising
   (i) a sensor operable to generate a status signal upon sensing a condition experienced by an entity that carries said low frequency radio tag,
   (ii) a clock to generate a time signal corresponding to said status signal, said data storage device being operable to store corresponding pairs of status and time signals as a temporal history of conditions experienced by said object.

17. The system as set forth in claim 16, said condition being selected from the group consisting of: temperature change, shock, change in GPS position, and dampness.

18. The system as set forth in claim 10, said transceiver being operable to automatically transmit said temporal history at said first radio frequency upon receipt by said transceiver of a data signal that corresponds to said identification data stored at said data storage device.

19. The system as set forth in claim 1, said low frequency radio tag further comprising a display operable to display data relating to said low frequency radio tag and an entity carrying said low frequency radio tag.

20. The system as set forth in claim 1, said low frequency radio tag further comprising key buttons operable for manual entry of data.

21. The system as set forth in claim 1, said low frequency radio tag being formed with two major surfaces at opposite sides thereof, a first major surface on a first side of said low frequency radio tag being substantially flat to facilitate attachment to a surface of an object, a second major surface of said low frequency radio tag being substantially convex.

22. The system as set forth in claim 21, said first side being provided with a key button operable to automatically electronically detect whether or not the low frequency radio tag is in contact with a package or other object.

23. The system as set forth in claim 1, said programmed data processor of said low frequency radio tag being operable to compare a transmitted ID code with a stored ID code and, in the event of a match, to respond to said transmitted ID code.

24. The system as set forth in claim 23, said programmed data processor of said low frequency radio tag being operable to compare a transmitted ID code from a server to a plurality of ID codes stored in said data storage device of said low frequency radio tag and, in the event of a match, to respond to said transmitted ID code.

25. The system as set forth in claim 16 that can transmit a signal when a condition related to a sensor attains a preselected value.

26. The system as set forth in claim 24, wherein the data storage device is programmable to store said plurality of ID codes.

27. The system as set forth in claim 23 wherein said stored ID codes are programmable to enable erasure thereof and thereafter to enable programming of other ID codes in said data storage device.

28. A method for detection and tracking of inanimate and animate entities, said method comprising the steps of:
   a) attaching a low frequency radio detection tag to each of the entities, each low frequency radio detection tag comprising:
      a tag communication antenna operable at a first radio frequency not exceeding 1 megahertz; a transceiver operatively connected to said tag communication antenna, said transceiver being operable to transmit and receive data signals at said first radio frequency;
      a data storage device operable to store data comprising identification data for identifying said low frequency radio detection tag, a programmed data processor operable to process data received from said transceiver and said data storage device and to send data to cause said transceiver to emit an identification signal based upon said identification data stored in said data storage device; and
      an energy source for activating said transceiver and said data processor, said energy source comprising a tag energization antenna operable to receive radio frequency energy from an ambient radio frequency field of a second radio frequency;
   b) storing, in the data storage device of each low frequency radio detection tag, entity data relating to said entity;
   c) commingling the entities in a repository, said repository being provided with at least one field communication antenna operable at said first radio frequency, said field communication antenna being disposed at a distance from each entity that permits effective communication therewith at said first radio frequency;
   d) generating said ambient radio frequency field at the energization tag antenna of each entity by radiating said second radio frequency from a field energization antenna;
   e) reading the identification data and entity data from the transceiver of each low frequency radio detection tag by interrogating all low frequency radio detection tags in said repository with RF interrogation signals at said first radio frequency via said field communication antenna; and f) transmitting the identification data and entity data from each low frequency radio detection tag to a central data processor to provide a tally of the entities in said repository.

29. The method as set forth in claim 28, said entity data being selected from entity description data, address-of-origin data, destination address data, entity vulnerability data, and entity status data, said repository being selected from a truck, storage shelving, a warehouse, a livestock field, a freight container, and a sea vessel.

30. The method as set forth in claim 28, said first radio frequency being an integral multiple of said second radio frequency.

31. The method as set forth in claim 28, said field communication antenna comprising a large communication loop surrounding said entities, said field energization antenna comprising a large energization loop surrounding said entities.

32. The method as set forth in claim 28, said low frequency radio detection tag further comprising a sensor operable to generate a status signal upon sensing a condition (e.g. temperature change) experienced by an entity that carries said low frequency radio detection tag, said method further comprising the step of:
   (g) automatically transmitting a warning signal from said transceiver at said low frequency radio detection to said central data processor upon generation of said status signal.

33. The method as set forth in claim 28, said low frequency radio detection tag further comprising:
   (i) a sensor operable to generate a status signal upon sensing a condition experienced by an entity that carries said low frequency radio detection; and
   (ii) at least one indicator device,
   said method further comprising the step of:
   (h) automatically activating said at least one indicator device upon generation of said status signal.

34. The method as set forth in claim 28, said low frequency radio detection tag further comprising
   (i) a sensor operable to generate a status signal upon sensing a condition experienced by an entity that carries said low frequency radio detection tag and
   (ii) a clock to generate a time signal corresponding to said status signal,
   said method further comprising the steps of:
   (i) storing, in said data storage device, corresponding pairs of status and time signals as a temporal history of conditions experienced by said entity; and
   (j) transmitting, to said central data processor, said temporal history at said low radio frequency upon receipt by said transceiver of a data signal that corresponds to said identification data stored at said data storage device.

35. A low frequency radio tag for detection and tracking of animate and inanimate entities, said low frequency radio tag comprising:

a) a communication antenna operable at a first radio frequency not exceeding 1 megahertz;
b) a transceiver operatively connected to said communication antenna, said transceiver being operable to transmit and receive data signals at said first radio frequency;
c) a data storage device operable to store data comprising identification data for identifying said low frequency radio tag;
d) a data processor operable to process data received from said transceiver and said data storage device and to send data to cause said transceiver to emit an identification signal based upon said identification data stored in said data storage device; and
e) an energy source for activating said transceiver and said data processor, said energy source comprising a tag energization antenna operable to receive radio frequency energy from an ambient radio frequency field of a second radio frequency.

36. The low frequency radio tag as set forth in claim 35, said first radio frequency being an integral multiple of said second radio frequency.

37. The low frequency radio tag as set forth in claim 35, said first radio frequency being 128 hertz and said second radio frequency being 32 hertz.

38. The low frequency radio tag as set forth in claim 35, said tag communication antenna comprising a first plurality of turns of wire, said tag energization antenna comprising a second plurality of turns of wire.

39. The low frequency radio tag as set forth in claim 38, said tag communication antenna and said tag energization antenna each having a substantially flat configuration.

40. The low frequency radio tag as set forth in claim 39, said tag communication antenna and said tag energization antenna being integrated into a microelectronic device comprising said transceiver, said data storage device, said energy source, and said data processor.

41. The low frequency radio tag as set forth in claim 36, said low frequency radio tag comprising a frequency multiplier operable to integrally multiply the second radio frequency and to generate a clock signal at said first radio frequency and to supply said clock signal to said transceiver.

42. The low frequency radio tag as set forth in claim 35, further comprising a sensor operable to generate a status signal upon sensing a condition experienced by an entity that carries said low frequency radio tag, said transceiver being operable to automatically transmit a warning signal at said first radio frequency upon generation of said status signal.

43. The low frequency radio tag as set forth in claim 35, further comprising at least one indicator device which is automatically operable upon receipt by said transceiver of a data signal that corresponds to said identification data stored at said data storage device.

44. The low frequency radio tag as set forth in claim 35, further comprising
(i) a sensor operable to generate a status signal upon sensing a condition experienced by an entity that carries said low frequency radio tag, and
(ii) at least one indicator device which is automatically operable upon generation of said status signal.

45. The low frequency radio tag as set forth in claim 35, further comprising
(i) a sensor operable to generate a status signal upon sensing a condition experienced by an entity that carries said low frequency radio tag,
(ii) a clock to generate a time signal corresponding to said status signal, said data storage device being operable to store corresponding pairs of status and time signals as a temporal history of conditions experienced by said entity.

46. The low frequency radio tag as set forth in claim 45, said transceiver being operable to automatically transmit said temporal history at said first radio frequency upon receipt by said transceiver of a data signal that corresponds to said identification data stored at said data storage device.

47. The low frequency radio tag as set forth in claim 35, and further comprising a display operable to display data relating to said low frequency radio tag and an entity carrying said low frequency radio tag.

48. The low frequency radio tag as set forth in claim 35, and further comprising key buttons operable for manual entry of data.

49. The low frequency radio tag as set forth in claim 35, said tag being formed with two major surfaces at opposite sides thereof, a first major surface on a first side of said tag being substantially flat to facilitate attachment to a surface of an entity, a second major surface of said tag being substantially convex.

50. The low frequency radio tag as set forth in claim 49 said first side being provided with a key button operable to automatically electronically detect whether or not the tag is in contact with a package or other entity.

51. The low frequency radio tag as set forth in claim 35, said programmed data processor of said low frequency radio tag being operable to compare a transmitted ID code with a stored ID code and, in the event of a match, to respond to said transmitted ID code.

52. The low frequency radio tag as set forth in claim 46, said programmed data processor of said low radio frequency tag being operable to compare a transmitted ID code from a server to a plurality of ID codes stored in said data storage device of said low frequency radio tag and, in the event of a match, to respond to said transmitted ID code.

53. The low frequency radio tag as set forth in claim 45 that can transmit a signal when a condition related to a sensor attains a pre-selected value.

54. The low frequency radio tag as set forth in claim 52, wherein the data storage device is programmable to store said plurality of ID codes.

55. The low frequency radio tag as set forth in claim 35 which further comprises a rectifier device operable to convert said radio frequency energy received by said tag energization antenna into DC current.

56. An integrated microelectronic device for use in a low frequency radio tag for detection and tracking of animate and inanimate entities, said low frequency radio tag comprising a communication antenna operable at a first radio frequency not exceeding 1 megahertz, said low frequency radio tag further comprising a tag energization antenna operable to receive radio frequency energy from an ambient radio frequency field of a second radio frequency, said microelectronic device comprising:
a) a transceiver for operative connection to said communication antenna, said transceiver being operable to transmit and receive data signals at said first radio frequency;
b) a data storage device operable to store data comprising identification data for identifying said low frequency radio tag;
c) a data processor operable to process data received from said transceiver and said data storage device and to send data to cause said transceiver to emit an identification signal based upon said identification data stored in said data storage device;

d) an energy source circuit for operative connection to said tag energization antenna for activating said transceiver and said data processor.

57. The microelectronic device as set forth in claim 56, said first radio frequency being an integral multiple of said second radio frequency.

58. The microelectronic device as set forth in claim 56 said first radio frequency being 128 hertz and said second radio frequency being 32 hertz.

59. The microelectronic device as set forth in claim 56, said tag communication antenna and said tag energization antenna being integrated into said microelectronic device.

60. The microelectronic device as set forth in claim 59, wherein said tag communication antenna comprises a first plurality of turns of wire, and said tag energization antenna comprises a second plurality of turns of wire.

61. The microelectronic device as set forth in claim 59, said tag communication antenna and said tag energization antenna each having a substantially flat configuration.

62. The microelectronic device as set forth in claim 57, said microelectronic device further comprising a frequency multiplier operable to integrally multiply the second radio frequency and to generate a clock signal at said first radio frequency and to supply said clock signal to said transceiver.

63. The microelectronic device as set forth in claim 56, further comprising a sensor operable to generate a status signal upon sensing a condition experienced by an entity that carries said low frequency radio tag.

64. The microelectronic device as set forth in claim 56, further comprising a sensor operable to generate a status signal upon sensing a condition experienced by an entity that carries said low frequency radio tag, said transceiver being operable to automatically transmit a warning signal at said first radio frequency upon generation of said status signal.

65. The microelectronic device as set forth in claim 56, further comprising:
  i) a sensor operable to generate a status signal upon sensing a condition experienced by an entity that carries said low frequency radio tag,
  (ii) a clock operable to generate a time signal corresponding to said status signal, said data storage device being operable to store corresponding pairs of status and time signals as a temporal history of conditions experienced by said entity.

66. The microelectronic device as set forth in claim 56, further comprising a sensor operable to generate a status signal upon sensing a condition experienced by an entity that carries said low frequency radio tag, said transceiver being operable to automatically transmit said temporal history at said first radio frequency upon receipt by said transceiver of a data signal that corresponds to said identification data stored at said data storage device.

67. The microelectronic device as set forth in claim 56, said programmed data processor being operable to compare a transmitted ID code with a stored ID code and, in the event of a match, to respond to said transmitted ID code.

68. The microelectronic device as set forth in claim 66, said programmed data processor of said low frequency radio tag being operable to compare a transmitted ID code to a plurality of ID codes stored in said data storage device of said low frequency radio tag and, in the event of a match, to respond to said transmitted ID code.

69. The microelectronic device as set forth in claim 63 that transmits a signal when a condition related to a sensor attains a pre-selected value.

70. The microelectronic device as set forth in claim 68, wherein the data storage device is programmable to store said plurality of ID codes.

71. The microelectronic device as set forth in claim 55 which further comprises a rectifier device operable to convert said radio frequency energy received by said tag energization antenna into DC current.

* * * * *